(12) United States Patent
Karjala et al.

(10) Patent No.: US 8,822,601 B2
(45) Date of Patent: Sep. 2, 2014

(54) ETHYLENE-BASED POLYMERS AND PROCESSES TO MAKE THE SAME

(75) Inventors: Teresa P. Karjala, Lake Jackson, TX (US); Lori L. Kardos, Sugar Land, TX (US); Wallace W. Yau, Pearland, TX (US); Jose Ortega, Lake Johnson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/990,064

(22) PCT Filed: Dec. 2, 2011

(86) PCT No.: PCT/US2011/062991
§ 371 (c)(1),
(2), (4) Date: May 29, 2013

(87) PCT Pub. No.: WO2012/082393
PCT Pub. Date: Jun. 21, 2012

(65) Prior Publication Data
US 2013/0261265 A1    Oct. 3, 2013

Related U.S. Application Data

(60) Provisional application No. 61/424,386, filed on Dec. 17, 2010.

(51) Int. Cl.
*C08F 8/00* (2006.01)
*C08L 23/04* (2006.01)

(52) U.S. Cl.
USPC .......................................... 525/191; 525/240

(58) Field of Classification Search
CPC ...... C08F 10/02; C08F 110/02; C08F 210/00; C08F 2/01; C08L 23/02; C08L 23/16; C08L 23/0807; C08L 2203/30
USPC .................................................... 525/191, 240
See application file for complete search history.

(56) References Cited

U.S. PATENT DOCUMENTS

| | | | |
|---|---|---|---|
| 4,511,609 A | 4/1985 | Craver et al. | |
| 4,705,829 A | 11/1987 | Kwack et al. | |
| 5,741,861 A | 4/1998 | Yamamoto et al. | |
| 5,863,665 A * | 1/1999 | Kale et al. | 428/523 |
| 6,407,191 B1 | 6/2002 | Mezquita et al. | |
| 2008/0038533 A1 | 2/2008 | Best et al. | |
| 2008/0125553 A1 | 5/2008 | Conrad et al. | |
| 2010/0317804 A1 * | 12/2010 | Karjala et al. | 525/240 |
| 2012/0130019 A1 | 5/2012 | Karjala et al. | |

FOREIGN PATENT DOCUMENTS

| | | | |
|---|---|---|---|
| JP | 61241339 A | 10/1986 | |
| JP | 2005232227 A | 9/2005 | |

OTHER PUBLICATIONS

PCT/US2011/062991 International Search Report and Written Opinion of the International Searching Authority Mar. 28, 2012.
PCT/US2011/062991 International Preliminary Report on Patentability Jun. 27, 2013.

* cited by examiner

*Primary Examiner* — Nathan M Nutter

(57) ABSTRACT

The invention provides an ethylene-based polymer comprising the following properties: A) a MWDconv from 7 to 10; and B) a "normalized LSF" greater than, or equal to, 9.5.

14 Claims, 6 Drawing Sheets

Reactor Temperature Profile Example 2

Reactor Profile Comparative Example 20

US 8,822,601 B2

ETHYLENE-BASED POLYMERS AND PROCESSES TO MAKE THE SAME

REFERENCE TO RELATED APPLICATIONS

The present application is a 371 application of International Application No. PCT/US11/62991, filed on Dec. 2, 2011, which claims the benefit of U.S. Provisional Application No. 61/424,386, filed on Dec. 17, 2010.

BACKGROUND OF THE INVENTION

There are many types of polyethylene made and sold today. Two types in particular are made by various suppliers and sold in large quantities. These two types are linear low density polyethylene (LLDPE) and low density polyethylene (LDPE) produced in the high pressure process by free radical chemistry. However, there is a need for new ethylene-based polymers that can be blended with other polymers, such as a LLDPE, to be used to form films with good optics, and which provide increased output rates on blown film lines.

U.S. Publication No. 2008/0125553 discloses an ethylene homo or copolymer characterized as having long chain branching, and having a molecular weight distribution, Mw/Mn, and a GPC-LALLS CDF, which satisfies the following relationship: y=0.0663x−0.015, where y=GPC-LALLS CDF, and x=Mw/Mn measured by conventional GPC. A line drawn from where the LS chromatogram intersects at molecular weight 350,000 and molecular weight 1,150,000 has a positive slope. The polymer preferably has a melt index between 0.15 and 2000 g/10 minutes and has long chain branching. In addition, the invention relates to a free radical initiation polymerization process comprising reacting ethylene, and optionally one or more comonomers, at a high pressure, conveniently between 13,000 psig and 100,000 psig, and at reactor temperatures of 115-400° C., preferably 125-400° C., more preferably 140-350° C., especially 165-320° C., in a reactor system comprising at least one tubular, and at least one autoclave reactor. The monomer(s) feed into the reactors is/are divided into multiple monomer feed streams, and where at least one feed stream into the tubular reactor consists essentially of unreacted monomer.

U.S. Pat. No. 6,407,191 discloses an ethylene homo or copolymer having a density between 0.923 and 0.935 g/cm$^3$, a molecular weight distribution (Mw/Mn) between 3 and 10, and comprising from 0.10 to 0.50 weight percent of units derived from a carbonyl group containing compound, based on the total weight of the homo or copolymer. In addition, the invention relates to a free radical initiation polymerization process for the preparation of medium density ethylene polymers or copolymers, comprising reacting ethylene, and optionally one or more comonomers, at a high pressure, conveniently between 1600 and 4000 kg/cm$^2$, and at temperatures of about 150-330° C., in a reactor system consisting of at least one autoclave reactor, or of a combination of autoclave and tubular reactors, in the presence of free radical initiators and a carbonyl group containing compound. The invention also relates to "carbonyl group containing" chain transfer agents for improved polymer processing and performance properties in flat die extrusion processes and applications.

U.S. Pat. No. 5,741,861 discloses a resin composition containing 50 to 99 percent by weight of component A, which is a copolymer of ethylene and α-olefin, and 1 to 50 percent by weight of component B, which is a high-pressure low-density polyethylene. Component A has the following properties: (a) a melt flow rate (MFR) of 2 to 30 g/10 min, (b) a density of not more than 0.935 g/cm$^3$, and (c) a single peak of elution volume, indicated by an elution curve obtained by temperature rising elution fractionation; the peak corresponding to a temperature within a range of from 20° C. to 85° C., and the elution curve satisfying a relationship in which the ratio H/W is not less than one, when H represents the height of the peak, and W represents the width of the elution curve at half of the height of H. Component B has the following properties: (a') a melt flow rate of 0.1 to 20 g/10 min, (b') a density of 0.915 to 0.93 g/cm$^3$, (c') a memory effect (ME) of not less than 1.6, and (d) a melt tension (MT) of not less than 1.5 g. The resin composition is used as a laminate material, and is disclosed as having improved workability, and excellent properties with respect to low-temperature heat sealability, heat sealing strength and hot tack.

Additional low density polyethylenes and blends are disclosed in the following: U.S. Pat. No. 4,511,609; U.S. Pat. No. 4,705,829; U.S. Publication No. 2008/0038533; JP61-241339 (Abstract); JP2005-232227 (Abstract); and International Publication Nos. WO2010/144784 and WO2011/019563.

As discussed above, there is a need for new ethylene-based polymers that can be blended with other polymers, such as a LLDPE, to be used to form films with good optics, and which provide increased output rates on blown film lines. These needs have been met by the following inventions.

SUMMARY OF THE INVENTION

The invention provides an ethylene-based polymer comprising the following properties:
A) a $MWD_{conv}$ from 7 to 10; and
B) a "normalized LSF" greater than, or equal to, 9.5.

DETAILED DESCRIPTION

Figure 1:
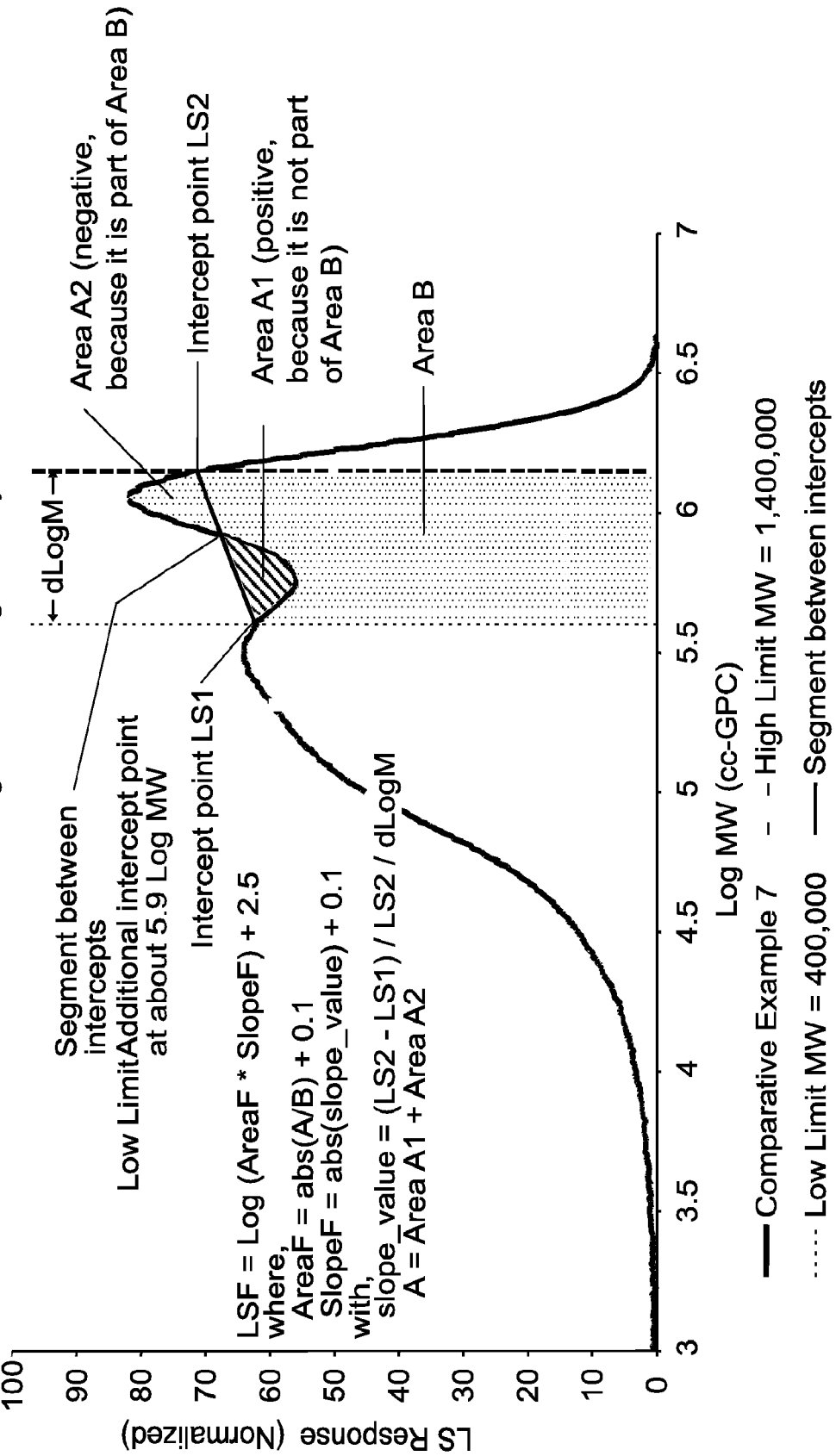
FIG. 1 depicts a GPC-LS (light scattering) profile of a comparative LDPE.

The invention provides an ethylene-based polymer comprising the following properties:
A) a $MWD_{conv}$ from 7 to 10; and
B) a "normalized LSF" greater than, or equal to, 9.5, preferably greater than, or equal to, 10.

The ethylene-based polymer may comprise a combination of two or more embodiments as described herein.

In one embodiment, the ethylene-based polymer further comprises C) a melt index greater than, or equal to, 1.0 g/10 min, preferably greater than, or equal to, 1.3 g/10 min, more preferably greater than, or equal to, 1.5 g/10 min.

In one embodiment, the $MWD_{conv}$ is greater than, or equal to, 7.2, or greater than, or equal to, 7.5.

In one embodiment, the ethylene-based polymer has a melt index from 1 to 50 g/10 min, or from 1 to 20 g/10 min, or from 1 to 10 g/10 min, or from 1.5 to 3 g/10 min.

In one embodiment, the ethylene-based polymer is formed in a high pressure (P greater than 100 MPa) polymerization process.

In one embodiment, the ethylene-based polymer has an $MWD_{conv}$ from 7 to 20.

In one embodiment, the ethylene-based polymer is a low density polyethylene (LDPE).

In one embodiment, the ethylene-based polymer has ≥0.1 amyl branche(s) per 1000 carbon atoms, or ≥0.5 amyl branche(s) per 1000 carbon atoms, or ≥1 amyl branche(s) per 1000 carbon atoms.

In one embodiment, the ethylene-based polymer has a density from 0.90 to 0.95 g/cc, preferably from 0.915 to 0.935 g/cc.

In one embodiment, the ethylene-based polymer has a melt strength greater than, or equal to 5 cN, or greater than, or equal to 6 cN, or greater than, or equal to 6.5 cN.

In one embodiment, the ethylene-based polymer has a melt strength from 5 to 15 cN.

In one embodiment, the ethylene-based polymer has a rheology ratio (V0.1/V 100), at 190° C., greater than, or equal to 18, or greater than, or equal to 19.

In one embodiment, the ethylene-based polymer has a rheology ratio (V0.1/V100), at 190° C., from 10 to 25, or from 10 to 20.

In one embodiment, the ethylene-based polymer has tan delta (measured at 0.1 rad/s) less than, or equal to 5, or less than, or equal to 4.5.

An inventive polymer may comprise a combination of two or more embodiments as described herein.

The invention also provides a composition comprising an inventive ethylene-based polymer.

In one embodiment, the ethylene-based polymer is present at greater than, or equal to, 10 weight percent, based on the weight of the composition.

In one embodiment, the ethylene-based polymer is present in an amount from 10 to 50 weight percent, or 20 to 40 weight percent, based on the weight of the composition.

In one embodiment, the composition further comprises another ethylene-based polymer that differs in one or more properties, such as density, melt index, comonomer, comonomer content, etc., from the inventive ethylene-based polymer. Suitable other ethylene-based polymers include, but are not limited to, DOWLEX Polyethylene Resins, TUFLIN Linear low Density Polyethylene Resins, ELITE Enhanced Polyethylene Resins (all available from The Dow Chemical Company), high density polyethylenes (d≥0.96 Wee), medium density polyethylenes (density from 0.935 to 0.955 g/cc), EXCEED polymers and ENABLE polymers (both from ExxonMobil), and LDPE EVA.

In one embodiment, the composition further comprises a propylene-based polymer. Suitable propylene-based polymers include polypropylene homopolymers, propylene/α-olefin interpolymers, and propylene/ethylene interpolymers.

In one embodiment, the composition further comprises a heterogeneously branched ethylene/α-olefin interpolymer, and preferably a heterogeneously branched ethylene/α-olefin copolymer. In one embodiment, the heterogeneously branched ethylene/α-olefin interpolymer, and preferably a heterogeneously branched ethylene/α-olefin copolymer, has a density from 0.89 to 0.94 g/cc, or from 0.90 to 0.93 g/cc. In a further embodiment, the composition comprises 10 to 50 weight percent, or 20 to 40 weight percent, of the inventive ethylene-based polymer, based on the weight of the composition.

An inventive composition may comprise a combination of two or more embodiments as described herein.

The invention also provides an article comprising at least one component formed from an inventive composition.

In one embodiment, the article is a film.

In one embodiment, the film has a haze less than 8% and a MD shrink tension greater than 9 psi.

In one embodiment the film has a puncture greater than 180 ft-lb/in$^3$.

In one, the film is formed from a composition comprising from 10 to 40 weight percent, or 20 to 40 weight percent, of an inventive ethylene-based polymer, and comprising a majority weight percent of a heterogeneously branched ethylene/α-olefin interpolymer; each weight percent based on the weight of the composition. In a further embodiment, the film has a Haze (%) value less than 7.5% preferably less than 7%. In a further embodiment, the film has a MD Shrink Tension greater than 9 psi, preferably greater than 10 psi, more preferably greater than 15 psi.

The invention also provides a process for forming a polymer of any of the previous claims, the process comprising polymerizing ethylene, and optionally at least one comonomer, in a tubular reactor, at an average polymerization temperature greater than, or equal to, 280° C., a polymerization pressure less than 37,000 psi, and in the presence of a chain transfer agent (CTA).

An inventive ethylene-based polymer may comprise a combination of two or more embodiments as described herein.

An inventive composition may comprise a combination of two or more embodiments as described herein.

An inventive article may comprise a combination of two or more embodiments as described herein. An inventive film may comprise a combination of two or more embodiments as described herein.

An inventive process may comprise a combination of two or more embodiments as described herein.

Process

For producing an inventive ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 m. The beginning of a reaction zone for either type of reactor is typically defined by the side injection of either initiator of the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

A chain transfer agent can be used to control molecular weight. In a preferred embodiment, one or more chain transfer agents (CTAS) are added to an inventive polymerization process. Typical CTA's that can be used include, but are not limited to, propylene, isobutane, n-butane, 1-butene, methyl ethyl ketone, acetone, and propionaldehyde. In one embodiment, the amount of CTA used in the process is from 0.03 to 10 weight percent of the total reaction mixture.

Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that purified ethylene is required to make the ethylene-based polymer. In such cases ethylene from the recycle loop may be used.

In one embodiment, the ethylene-based polymer is a polyethylene homopolymer.

In another embodiment, the ethylene-based polymer comprises ethylene and one or more comonomers, and preferably one comonomer. Comonomers include, but are not limited to, α-olefin comonomers, typically having no more than 20 carbon atoms. For example, the α-olefin comonomers may have 3 to 10 carbon atoms; or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α, β-unsaturated C3-C8-carboxylic acids, in particular maleic acid, fumaric acid, itaconic acid, acrylic acid, methacrylic acid and crotonic acid derivates of the α,β-unsaturated C3-C8-carboxylic acids, for example unsaturated C3-C15-carboxylic acid esters, in particular ester of C1-C6-alkanols, or anhydrides, in particular methyl methacrylate, ethyl methacrylate, n-butyl methacrylate, ter-butyl methacrylate, methyl acrylate, ethyl acrylate n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive polymer.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes. Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Tex.).

Blends and mixtures of the inventive polymer with other polymers may be performed. Suitable polymers for blending with the inventive polymer include natural and synthetic polymers. Exemplary polymers for blending include propylene-based polymers (both impact modifying polypropylene, isotactic polypropylene, atactic polypropylene, and random ethylene/propylene copolymers), various types of ethylene-based polymers, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising the inventive polymer).

Applications

The polymers of this invention may be employed in a variety of conventional thermoplastic fabrication processes to produce useful articles, including, but not limited to, monolayer and multilayer films; molded articles, such as blow molded, injection molded, or rotomolded articles; coatings; fibers; and woven or non-woven fabrics.

An inventive polymer may be used in a variety of films, including but not limited to, lamination films, clarity shrink films, collation shrink films, cast stretch films, silage films, stretch hood, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding process, or rotomolding processes.

Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

DEFINITIONS

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer includes copolymers (employed to refer to polymers prepared from two different monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprises at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Samples for density measurements were prepared according to ASTM D 4703-10. Samples were pressed at 374° F. (190° C.) for five minutes at 10,000 psi (68 MPa). The temperature was maintained at 374° F. (190° C.) for the above five minutes, and then the pressure was increased to 30,000 psi (207 MPa) for three minutes. This was followed by one minute hold at 70° F. (21° C.) and 30,000 psi (207 MPa). Measurements were made within one hour of sample pressing using ASTM D792-08, Method B.

Melt Index

Melt index, or I2, was measured in accordance with ASTM D 1238-10, Condition 190° C./2.16 kg, and was reported in grams eluted per 10 minutes. The H0 was measured in accordance with ASTM D 1238, Condition 190° C./10 kg, and was reported in grams.

Nuclear Magnetic Resonance ($^{13}C$ NMR)

Samples are prepared by adding approximately "3 g" of a "50/50 mixture of tetrachloroethane-d2/orthodichlorobenzene, containing 0.025 M Cr(AcAc)$_3$," to a "0.25 to 0.40 g" polymer sample, in a 10 mm NMR tube. Oxygen is removed from the sample by placing the open tubes in a nitrogen environment for at least 45 minutes. The samples are then dissolved and homogenized by heating the tube and its contents to 150° C., using a heating block and heat gun. Each dissolved sample is visually inspected to ensure homogeneity. Samples are thoroughly mixed, immediately prior to analysis and are not allowed to cool before insertion into the heated NMR sample holders.

All data are collected using a Bruker 400 MHz spectrometer. The data is acquired using a six second pulse repetition delay, 90-degree flip angles, and inverse gated decoupling, with a sample temperature of 125° C. All measurements are made on non-spinning samples in locked mode. Samples are allowed to thermally equilibrate for seven minutes prior to data acquisition. The 13C NMR chemical shifts are internally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine "C6+" value.

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm Dynamic Mechanical Spectroscopy (DMS)

Resins were compression-molded into "3 mm thick×1 inch" circular plaques at 350° F. for five minutes, under 1500 psi pressure, in air. The sample was then taken out of the press, and placed on the counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The stress response was analyzed in terms of amplitude and phase, from which the storage modulus (G'), loss modulus (G"), complex modulus (G*), complex viscosity η*, tan (δ) or tan delta, viscosity at 0.1 rad/s (V0.1), the viscosity at 100 rad/s (V100), and the viscosity ratio (V0.1/V100) were calculated.

Triple Detector Gel Permeation Chromatography (TDGPC)—Conventional GPC, Light Scattering GPC, and gpcBR For the GPC techniques used herein (Conventional GPC, Light Scattering GPC, and gpcBR), a Triple Detector Gel Permeation Chromatography (3D-GPC or TDGPC) system was used. This system consists of a Waters (Milford, Mass.) model 150 C High Temperature Chromatograph (other suitable high temperatures GPC instruments include Polymer Laboratories (Shropshire, UK) Model 210 and Model 220), equipped with a Precision Detectors (Amherst, Mass.) 2-angle laser light scattering (LS) detector Model 2040, an IR4 infra-red detector from Polymer ChAR (Valencia, Spain), and a Viscotek (Houston, Tex.) 150R 4-capillary solution viscometer (DP).

A GPC with these latter two independent detectors and at least one of the former detectors is sometimes referred to as "3D-GPC" or "TDGPC," while the term "GPC" alone generally refers to conventional GPC. Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

The eluent from the GPC column set flows through each detector arranged in series, in the following order: LS detector, IR4 detector, then DP detector. The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log (MW and intrinsic viscosity) results from using a broad polyethylene standard, as outlined in the section on Light Scattering (LS) GPC below, in the paragraph following Equation (5).

Suitable high temperature GPC columns can be used, such as four 30 cm long Shodex HT803 13 micron columns, or four 30 cm Polymer Labs columns of 20-micron mixed-pore-size packing (MixA LS, Polymer Labs). Here, the MixA LS columns were used. The sample carousel compartment is operated at 140° C., and the column compartment is operated at 150° C. The samples are prepared at a concentration of "0.1 grams of polymer in 50 milliliters of solvent." The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1 ml/minute.

Conventional GPC

For Conventional GPC, the IR4 detector is used, and the GPC column set is calibrated by running 21 narrow molecular weight distribution polystyrene standards. The molecular weight (MW) of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to or greater than 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \quad \text{(Eq. 1)},$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as outlined in the section on Light Scattering (LS) GPC below in the paragraph following Equation (5). Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{CC} = \sum_i \left( \frac{C_i}{\sum_i C_i} \right) M_i = \sum_i w_i M_{cc,i} \quad \text{(Eq. 2)}$$

$$M_{n,cc} = \sum w_i / \sum (w_i / M_{cc,i}) \quad \text{(Eq. 3)}$$

$$M_{z,cc} = \sum (w_i M_{cc,i}^2) / \sum (w_i M_{cc,i}) \quad \text{(Eq. 4)}$$

Light Scattering (LS) GPC

For the LS GPC, the Precision Detector PDI2040 detector Model 2040 is used. Depending on the sample, either the 15° angle or the 90° angle of the light scattering detector is used for calculation purposes. Here, the 15° angle was used.

The molecular weight data is obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector area, and the mass detector constant derived from a suitable linear polyethylene homopolymer, or one of the polyethylene standards of known weight average molecular weight. The calculated molecular weights are obtained using a light scattering constant, derived from one or more of the polyethylene standards mentioned below, and a refractive index concentration coefficient, do/dc, of 0.104. Generally, the mass detector response and the light scattering constant should be determined from a linear standard with a molecular weight in excess of about 50,000 g/mole. The viscometer calibration can be accomplished using the methods described by the manufacturer, or, alternatively, by using the published values of suitable linear standards such as Standard Reference Materials (SRM) 1475a (available from National Institute of Standards and Technology (NIST)). The chromatographic concentrations are assumed low enough to eliminate addressing 2nd viral coefficient effects (concentration effects on molecular weight).

With 3D-GPC, absolute weight average molecular weight ("Mw, Abs") is determined using Equation (5) below, using the "peak area" method for higher accuracy and precision. The "LS Area" and the "Conc. Area" are generated by the chromatograph/detectors combination.

$$M_W = \sum_i w_i M_i \quad \text{(Eq. 5)}$$

$$= \sum_i \left( \frac{C_i}{\sum_i C_i} \right) M_i$$

$$= \frac{\sum_i C_i M_i}{\sum_i C_i}$$

-continued $$= \frac{\sum_i LS_i}{\sum_i C_i}$$

$$= \frac{LS \text{ Area}}{Conc. \text{ Area}}$$

For each LS profile (for example, see FIGS. 1 and 2), the x-axis (log MWcc-CPC), where cc refers to the conventional calibration curve, is determined as follows. First, the polystyrene standards (see above) are used to calibrate the retention volume into "log $MW_{PS}$." Then, Equation 1 (Mpolyethylene=A×(Mpolystyrene)$^B$) is used to convert "log $MW_{PS}$" to "log $MW_{PE}$." The "log $MW_{PE}$" scale serves as the x-axis for the LS profiles of the experimental section (log $MW_{PE}$ is equated to the log MW(cc-CPC)). The y-axis for each LS profile is the LS detector response normalized by the injected sample mass. Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume.

In the low molecular weight region of the GPC elution curve, the presence of a significant peak that is known to be caused by the presence of anti-oxidant or other additives, will cause an underestimation of the number average molecular weight (Mn) of the polymer sample, to give a overestimation of the sample polydispersity, defined as Mw/Mn, where Mw is the weight average molecular weight. The true polymer sample molecular weight distribution can therefore be calculated from the GPC elution by excluding this extra peak. This process is commonly described as the peak skim feature in data processing procedures in liquid chromatographic analyses. In this process, this additive peak is skimmed off from the GPC elution curve before the sample molecular weight calculation is performed from the GPC elution curve.

gpcBR Branching Index by Triple Detector GPC (3D-GPC)

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants. Upon obtaining the constants, the two values are used to construct two linear reference, conventional calibrations for polyethylene molecular weight and polyethylene intrinsic viscosity as a function of elution volume, as shown in Equations (6) and (7):

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad (\text{Eq. 6})$$

$$[\eta]_{PE} = K_{PS} \cdot \frac{M_{PS}^{\alpha+1}}{M_{PE}}. \quad (\text{Eq. 7})$$

The gpcBR branching index is a robust method for the characterization of long chain branching, as described in Yau, Wallace W., "Examples of Using 3D-GPC-TREF for Polyolefin Characterization," Macromol. Symp., 2007, 257, 29-45. The index avoids the "slice-by-slice" 3D-GPC calculations traditionally used in the determination of g' values and branching frequency calculations, in favor of whole polymer detector areas. From 3D-GPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With 3D-GPC, sample intrinsic viscosities are also obtained independently using Equations (8). The area calculation in Equation (5) and (8) offers more precision, because, as an overall sample area, it is much less sensitive to variation caused by detector noise and 3D-GPC settings on baseline and integration limits More importantly, the peak area calculation is not affected by the detector volume offsets. Similarly, the high-precision sample intrinsic viscosity (IV) is obtained by the area method shown in Equation (8):

$$IV = [\eta] \quad (\text{Eq. 8})$$

$$= \sum_i w_i IV_i$$

$$= \sum_i \left(\frac{C_i}{\sum_i C_i}\right) IV_i$$

$$= \frac{\sum_i C_i IV_i}{\sum_i C_i}$$

$$= \frac{\sum_i DP_i}{\sum_i C_i}$$

$$= \frac{DP \text{ Area}}{Conc. \text{ Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or $[\eta]$) of the sample.

Initially, the molecular weight and intrinsic viscosity for a linear polyethylene standard sample, such as SRM1475a or an equivalent, are determined using the conventional calibrations ("cc") for both molecular weight and intrinsic viscosity as a function of elution volume, per Equations (2) and (9):

$$[\eta]_{CC} = \sum_i \left(\frac{C_i}{\sum_i C_i}\right) IV_i = \sum_i w_i IV_{cc,i}. \quad (\text{Eq. 9})$$

Equation (10) is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad (\text{Eq. 10})$$

wherein $[\eta]$ is the measured intrinsic viscosity, $[\eta]_{cc}$ is the intrinsic viscosity from the conventional calibration, Mw is the measured weight average molecular weight, and $M_{w,cc}$ is the weight average molecular weight of the conventional calibration. The weight average molecular weight by light scattering (LS) using Equation (5) is commonly referred to as "absolute weight average molecular weight" or "$M_w$, Abs." The $M_{w,cc}$ from Equation (2) using conventional GPC molecular weight calibration curve ("conventional calibration") is often referred to as "polymer chain backbone molecular weight," "conventional weight average molecular weight," and "$M_{w,GPC}$."

All statistical values with the "cc" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for α and Log K for the determination of gpcBR in this particular case are 0.725 and −3.355, respectively, for polyethylene, and 0.722 and −3.993, respectively, for polystyrene.

Once the K and α values have been determined using the procedure discussed previously, the procedure is repeated using the branched samples. The branched samples are analyzed using the final Mark-Houwink constants as the best "cc" calibration values, and Equations (2)-(9) are applied.

The interpretation of gpcBR is straight forward. For linear polymers, gpcBR calculated from Equation (8), will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low 3D-GPC detector response at high molecular weight from the concentration detector. Errors in detector volume alignment also do not affect the precision of the gpcBR index determination.

Representative Calculation of "Normalized LSF"—Inventive and Comparative

Figure 2:
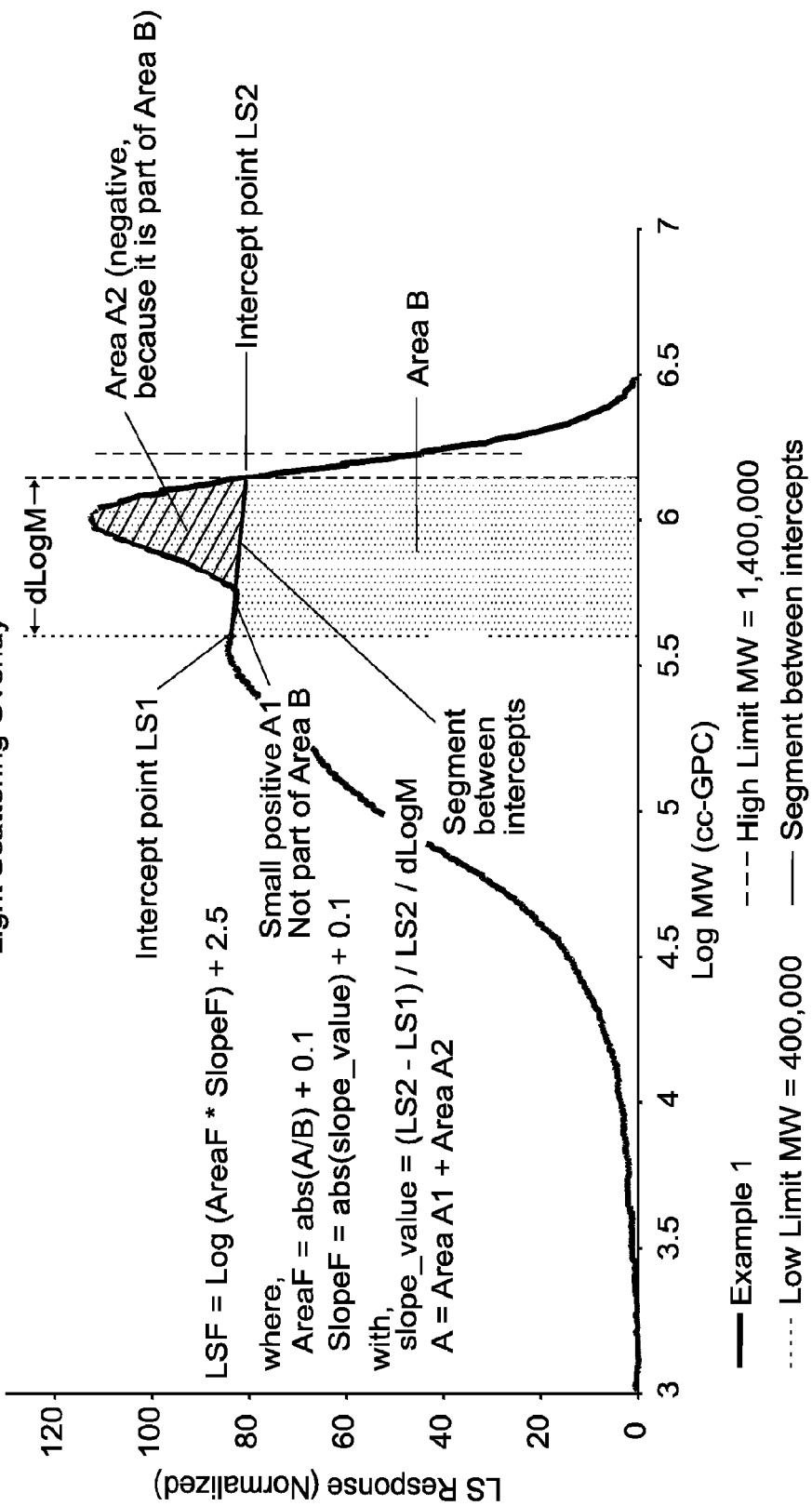
FIG. 2 depicts a GPC-LS (light scattering) profile of an inventive LDPE.

A GPC elution profile of the "concentration-normalized" LS detector response is shown in FIGS. 1 and 2, for Comparative Example 7 and Example 1, respectively. The quantities that affect the "Normalized LSF" value are defined with the aid of FIGS. 1 and 2. The x-axis in the plots is the logarithmic value of the molecular weight (MW) by conventional GPC calculation, or cc-GPC MW. The y-axis is the LS detector response, normalized for equal sample concentration, as measured by the peak area of the concentration detector (not shown). The specific features of the LS elution profile are captured in a window defined by two, "log-MW" limits shown in the FIGS. 1 and 2. The lower limit corresponds to a M1 value of 400,000 g/mol, and the upper limit corresponds to a M2 value of 1,400,000 g/mol.

The vertical lines of these two MW limits intersect with the LS elution curve at two points. A line segment is drawn connecting these two intercept points. The height of the LS signal at the first intercept (log M1) gives the S1 quantity. The height of the LS signal at the second intercept (log M2) gives the S2 quantity. The area under the LS elution curve, within the two MW limits, gives the quantity Area B. Comparing the LS curve with the line segment connecting the two intercepts, there can be part of the segregated area that is above the line segment (see A2 in the FIGS. 1 and 2, defined as a negative value) or below the line segment (like A1 in the FIGS. 1 and 2, defined as a positive value). The sum of A1 and A2 gives the quantity Area A, the total area of A. This total area A can be calculated as the difference between the Area B and the area below the line segment. The validity of this approach can be proven by the following two equations (note that A2 is negative as shown in the FIGS. 1 and 2). Since, (Area below line segment)=(Area B)+A2+A1=(Area B)+(Area A), therefore, (Area A)=(Area B)−(Area below line segment).

The steps of calculating the "Normalized LSF" quantity are illustrated with three examples (Comparative Example 7, Example 1, and Comparative Example 20) shown in Table 1 to 3.

Step 1, calculate "SlopeF" in Table 1, using following two equations:

$$\text{slope\_value}=[(LS2-LS1)/LS2]/d \log M \quad \text{(Eq. 11)}$$

$$\text{SlopeF}=\text{a slope function}=\text{Abs(slope\_value)}+0.1 \quad \text{(Eq. 12)}$$

Step 2, calculate "AreaF" and "LSF" in Table 2, using following two equations:

$$\text{AreaF}=\text{a area function}=\text{Abs}(A/B)+0.1 \quad \text{(Eq. 13)}$$

where, A/B=(Area A)/(Area B)

$$\text{LSF}=\text{Log}(\text{AreaF}\times\text{SlopeF})+2.5 \quad \text{(Eq. 14)}$$

Step 3, finally calculate "Nomalized LSF" in Table 3, using the following equation:

$$\text{"Normalized LSF"}=I2^{*}(cc\text{-GPC Mw/Mn})/\text{LSF} \quad \text{(Eq. 15)}.$$

TABLE 1

| | The "SlopeF" Calculation | | | | | | |
|---|---|---|---|---|---|---|---|
| | M1 = 400,000 g/mol | | M2 = 1,400,000 g/mol | | Log(M2) − Log(M1) | | Abs(slope) + 0.1 |
| Sample | LS1 | Log M1 | LS2 | Log M2 | dLog M | Slope Value | SlopeF |
| Comp. Ex. 7 | 62.207 | 5.602 | 71.407 | 6.146 | 0.544 | 0.237 | 0.337 |
| Ex. 1 | 83.631 | 5.602 | 80.386 | 6.146 | 0.544 | −0.074 | 0.174 |
| Comp. Ex. 20 | 57.882 | 5.602 | 73.856 | 6.146 | 0.544 | 0.398 | 0.498 |

TABLE 2

The "AreaF" and "LSF" Calculation

| Sample | LS curve Area B | Line segment Area (A + B) | (A + B) − B Area A | A/B | Abs(A/B) + 0.1 AreaF | Log(AreaF × SlopeF) + 2.5 LSF |
|---|---|---|---|---|---|---|
| Comp. Ex. 7 | 8518 | 8549 | 31 | 0.004 | 0.104 | 1.0427 |
| Ex. 1 | 10753 | 9330 | −1424 | −0.132 | 0.232 | 1.1062 |
| Comp. Ex. 20 | 7917 | 7400 | −517 | −0.065 | 0.165 | 1.4150 |

TABLE 3

The "Normalized LSF" Calculation

| Sample Name | I2 | Mw/Mn | LSF | Normalized LSF |
|---|---|---|---|---|
| Comp. Ex. 7 | 0.675 | 6.940 | 1.0427 | 4.494 |
| Ex. 1 | 1.841 | 8.210 | 1.1062 | 13.664 |
| Comp. Ex. 20 | 1.884 | 5.435 | 1.4150 | 7.236 |

Film Testing

The following physical properties were measured on the films as described in the experimental section.

Total (Overall) Haze and Internal Haze: Internal haze and total haze were measured according to ASTM D 1003-07. Internal haze was obtained via refractive index matching using mineral oil (1-2 teaspoons), which was applied as a coating on each surface of the film. A Hazegard Plus (BYK-Gardner USA; Columbia, Md.) was used for testing. For each test, five samples were examined, and an average reported. Sample dimensions were "6 in×6 in."

45° Gloss: ASTM D2457-08 (average of five film samples; each sample "10 in×10 in").

Clarity: ASTM D1746-09 (average of five film samples; each sample "10 in×10 in").

2% Secant Modulus-MD (machine direction) and CD (cross direction): ASTM D882-10 (average of five film samples in each direction; each sample "1 in×6 in").

MD and CD Elmendorf Tear Strength: ASTM D1922-09 (average of 15 film samples in each direction; each sample "3 in×2.5 in" half moon shape).

MD and CD Tensile Strength: ASTM D882-10 (average of five film samples in each direction; each sample "1 in×6 in").

Dart Impact Strength: ASTM D1709-09 (minimum of 20 drops to achieve a 50% failure; typically ten "10 in×36 in" strips).

Puncture Strength Puncture was measured on an INSTRON Model 4201 with SINTECH TESTWORKS SOFTWARE Version 3.10. The specimen size was "6 in×6 in," and four measurements were made to determine an average puncture value. The film was conditioned for 40 hours after film production, and at least 24 hours in an ASTM controlled laboratory (23° C. and 50% relative humidity). A "100 lb" load cell was used with a round specimen holder of 4 inch diameter. The puncture probe is a "½ inch diameter" polished stainless steel ball (on a 2.5" rod) with a "7.5 inch maximum travel length."

There was no gauge length, and the probe was as close as possible to, but not touching, the specimen. The probe was set by raising the probe until it touched the specimen. Then the probe was gradually lowered, until it was not touching the specimen. Then the crosshead was set at zero. Considering the maximum travel distance, the distance would be approximately 0.10 inch. The crosshead speed was 10 inches/minute. The thickness was measured in the middle of the specimen. The thickness of the film, the distance the crosshead traveled, and the peak load were used to determine the puncture by the software. The puncture probe was cleaned using a "KIM-WIPE" after each specimen.

Shrink Tension Shrink tension was measured according to the method described in Y. Jin, T. Hermel-Davidock, T. Kari ala, M. Demirors, J. Wang, E. Leyva, and D. Allen, "Shrink Force Measurement of Low Shrink Force Films", SPE ANTEC Proceedings, p. 1264 (2008). The shrink tension of film samples was measured through a temperature ramp test that was conducted on an RSA-III Dynamic Mechanical Analyzer (TA Instruments; New Castle, Del.) with a film fixture. Film specimens of "12.7 mm wide" and "63.5 mm long" were die cut from the film sample, either in the machine direction (MD) or the cross direction (CD), for testing. The film thickness was measured by a Mitutoyo Absolute digimatic indicator (Model C112CEXB). This indicator had a maximum measurement range of 12.7 mm, with a resolution of 0.001 mm. The average of three thickness measurements, at different locations on each film specimen, and the width of the specimen, were used to calculate the film's cross sectional area (A), in which "A=Width×Thickness" of the film specimen that was used in shrink film testing. A standard film tension fixture from TA Instruments was used for the measurement. The oven of the RSA-III was equilibrated at 25° C., for at least 30 minutes, prior to zeroing the gap and the axial force. The initial gap was set to 20 mm. The film specimen was then attached onto both the upper and the lower fixtures. Typically, measurements for MD only require one ply film. Because the shrink tension in the CD direction is typically low, two or four plies of films are stacked together for each measurement to improve the signal-to-noise ratio. In such a case, the film thickness is the sum of all of the plies. In this work, a single ply was used in the MD direction and two plies were used in the CD direction. After the film reached the initial temperature of 25° C., the upper fixture was manually raised or lowered slightly to obtain an axial force of −1.0 g. This was to ensure that no buckling or excessive stretching of the film occurred at the beginning of the test. Then the test was started. A constant fixture gap was maintained during the entire measurement.

The temperature ramp started at a rate of 90° C./min, from 25° C. to 80° C., followed by a rate of 20° C./min, from 80° C. to 160° C. During the ramp from 80° C. to 160° C., as the film shrunk, the shrink force, measured by the force transducer, was recorded as a function of temperature for further analysis. The difference between the "peak force" and the "baseline value before the onset of the shrink force peak" is considered the shrink force (F) of the film. The shrink tension of the film is the ratio of the shrink force (F) to the cross sectional area (A) of the film.

EXPERIMENTAL

Preparation of Inventive Ethylene-Based Polymers and Comparative Polymers

Figure 3:
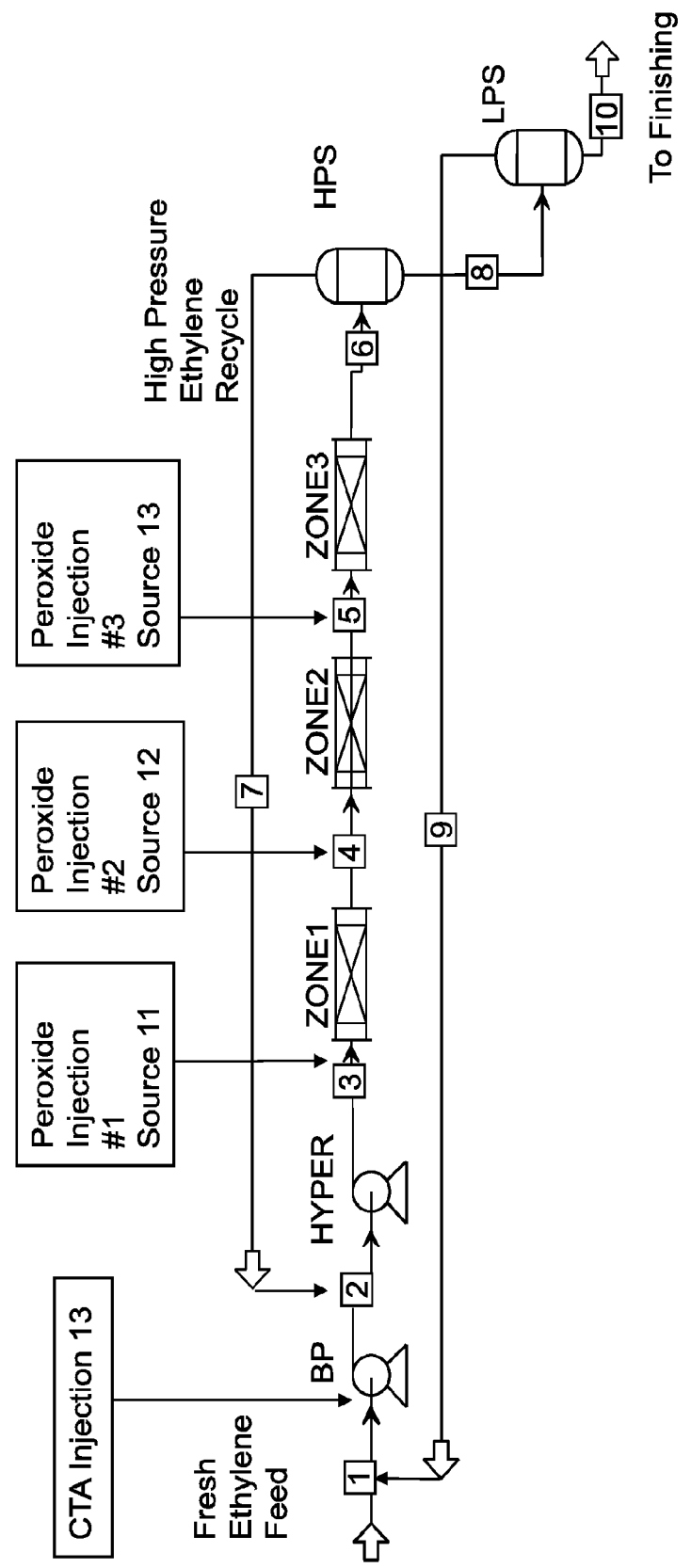
FIG. 3 depicts a partially closed-loop, dual recycle, high-pressure, low density polyethylene production system used to produce Examples 1-6.

When process conditions are discussed and compared, the process conditions may be referred to by their product designation (e.g., process conditions for producing Example 1 product may be referred to as "the process of Example 1"). Examples 1 through 6 are produced on the same process reaction system. FIG. 3 is a simple block diagram of the process reaction system used to produce the aforementioned examples.

The process reaction system in FIG. 3 is a partially closed-loop, dual recycle, high-pressure, low density polyethylene production system. The process reaction system is comprised of a fresh ethylene feed conduit [1]; a booster/primary compressor "BP," a hypercompressor "Hyper," and a three zone tube. The tube reactor consists of a first reaction feed zone; a first peroxide initiator conduit [3] connected to a first peroxide initiator source [11]; a second peroxide initiator conduit [4] connected to the second peroxide initiator source 12; and a third peroxide initiator conduit [5] connected to a second peroxide initiator source 12. Cooling jackets (using high pressure water) are mounted around the outer shell of the tube reactor and preheater. The tube reactor further consists of a high pressure separator "HPS;" a high pressure recycle line [7]; a low pressure separator "LPS;" a low pressure recycle line [9]; and a chain transfer agent (CTA) feed system 13.

The tube reactor further comprises three reaction zones demarcated by the location of peroxide injection points. The first reaction zone feed is attached to the front of the tube reactor, and feeds a portion of the process fluid into the first reaction zone. The first reaction zone starts at injection point #1 [3], and ends at injection point #2 [4]. The first peroxide initiator is connected to the tube reactor at injection point #1 [3]. The second reaction zone starts at injection point #2 [4]. The second reaction zone ends at injection point #3 [5]. The third reaction zone starts at injection point #3 [5]. For all the examples, 100 percent of the ethylene and ethylene recycles are directed to the first reaction zone, via the first reaction zone feed conduit [1]. This is referred to as an all front gas tubular reactor.

Figure 4:
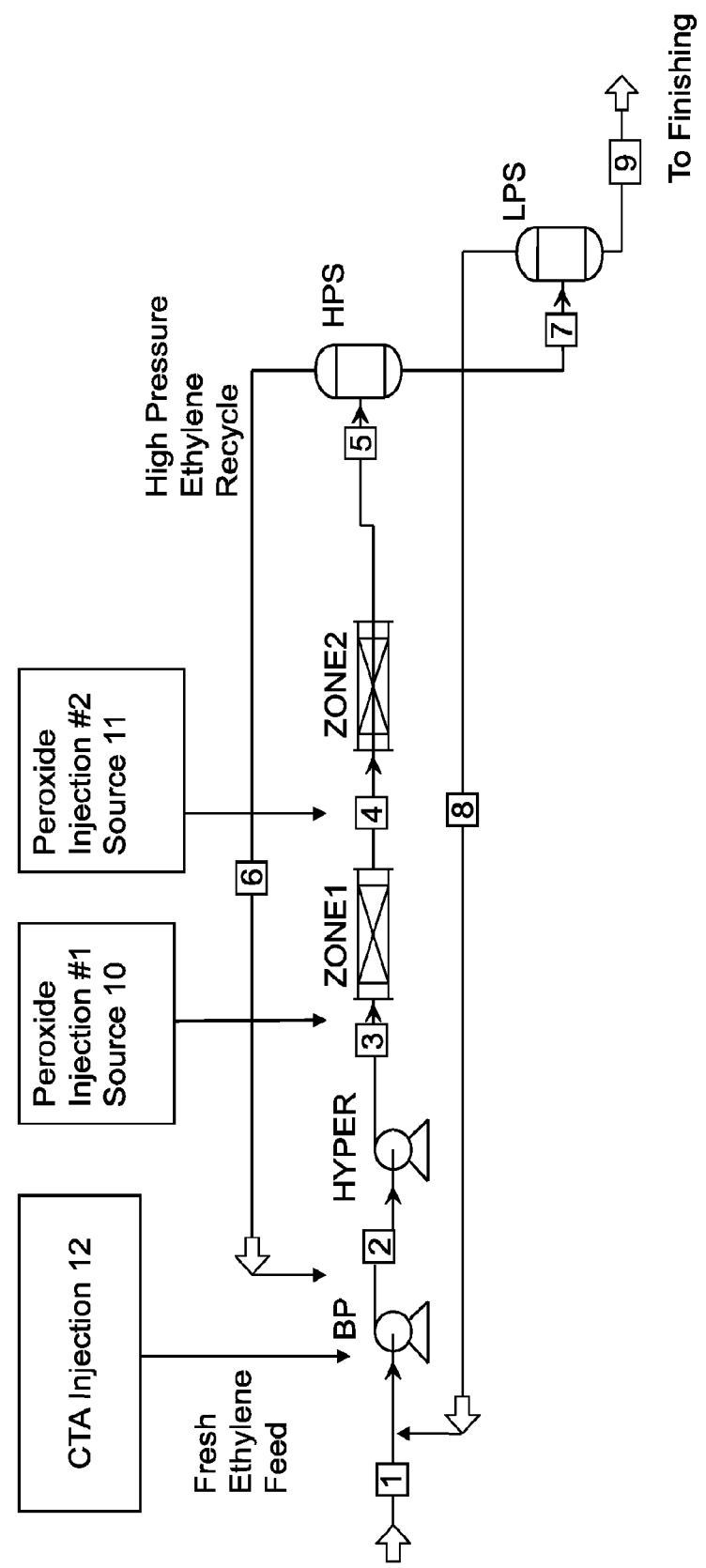
FIG. 4 depicts a block diagram of the process reaction system used to produce Comparative Example 20.

FIG. 4 is a simple block diagram of the process reaction system used to produce Comparative Example 20. The process reaction system, in FIG. 4, is a partially closed-loop, dual recycle, high-pressure, low density polyethylene production system. The process reaction system is comprised of a fresh ethylene feed conduit [1]; a booster/primary compressor "BP;" a hypercompressor "Hyper;" and a two zone tube reactor. The tube reactor consists of a first reaction feed zone; a first peroxide initiator conduit [3] connected to a first peroxide initiator source 10; a second peroxide initiator conduit [4] connected to the second peroxide initiator source 11; a high pressure separator "HPS;" a high pressure recycle line [6]; a low pressure separator "LPS;" a low pressure recycle line [8]; and a chain transfer agent (CTA) feed system [12]. Cooling jackets (using high pressure water) are mounted around the outer shell of the tube reactor and preheater.

The tube reactor further comprises three reaction zones demarcated by the location of peroxide injection points. The first reaction zone feed is attached to the front of the tube reactor, and feeds a portion of the process fluid into the first reaction zone. The first reaction zone starts at injection point #1 [3], and ends at injection point #2 [4]. The first peroxide initiator is connected to the tube reactor at injection point #1 [3]. The second reaction zone starts at injection point #2 [4]. For Comparative Example 20, 100 percent of the ethylene and ethylene recycles are directed to the first reaction zone, via the first reaction zone feed conduit [1]. This is referred to as an all front gas tubular reactor.

For all the inventive examples and the comparative example, a mixture containing t-butyl peroxy-2 ethylhexanoate (TBPO), di-t-butyl peroxide (DTBP), tert-butyl peroxypivalate (PIV), and an iso-paraffinic hydrocarbon solvent (boiling range>179° C.; for example, ISOPAR E) are used as the initiator mixture for the first injection point. For injection points #2 and #3, a mixture containing only DTBP, TBPO, and the iso-paraffinic hydrocarbon solvent are used. The reactor tube process conditions used to manufacture Examples 1-6 and Comparative Example 20 are given in Tables 4 and 6. Table 5 lists some chain transfer agents and their "Cs" values.

For Examples 1, 2, 4, 5, and 6 and Comparative Example 20, propylene was used as the CTA. The propylene is injected into the ethylene stream at the discharge drum of the first stage booster. The composition of the CTA feed to the process is adjusted to control the melt index of the product. For Example 3, isobutane was used as the CTA.

For Examples 1-6, the reactor pressure was between 34,700 to 36,000 psig. It was discovered that overall low reactor pressure (33,000-36,000 psig), in combination with a high average reactor temperature (>300° C.) and the CTA (for example, propylene), produced LDPEs with very broad MWD and low densities.

Figure 5:
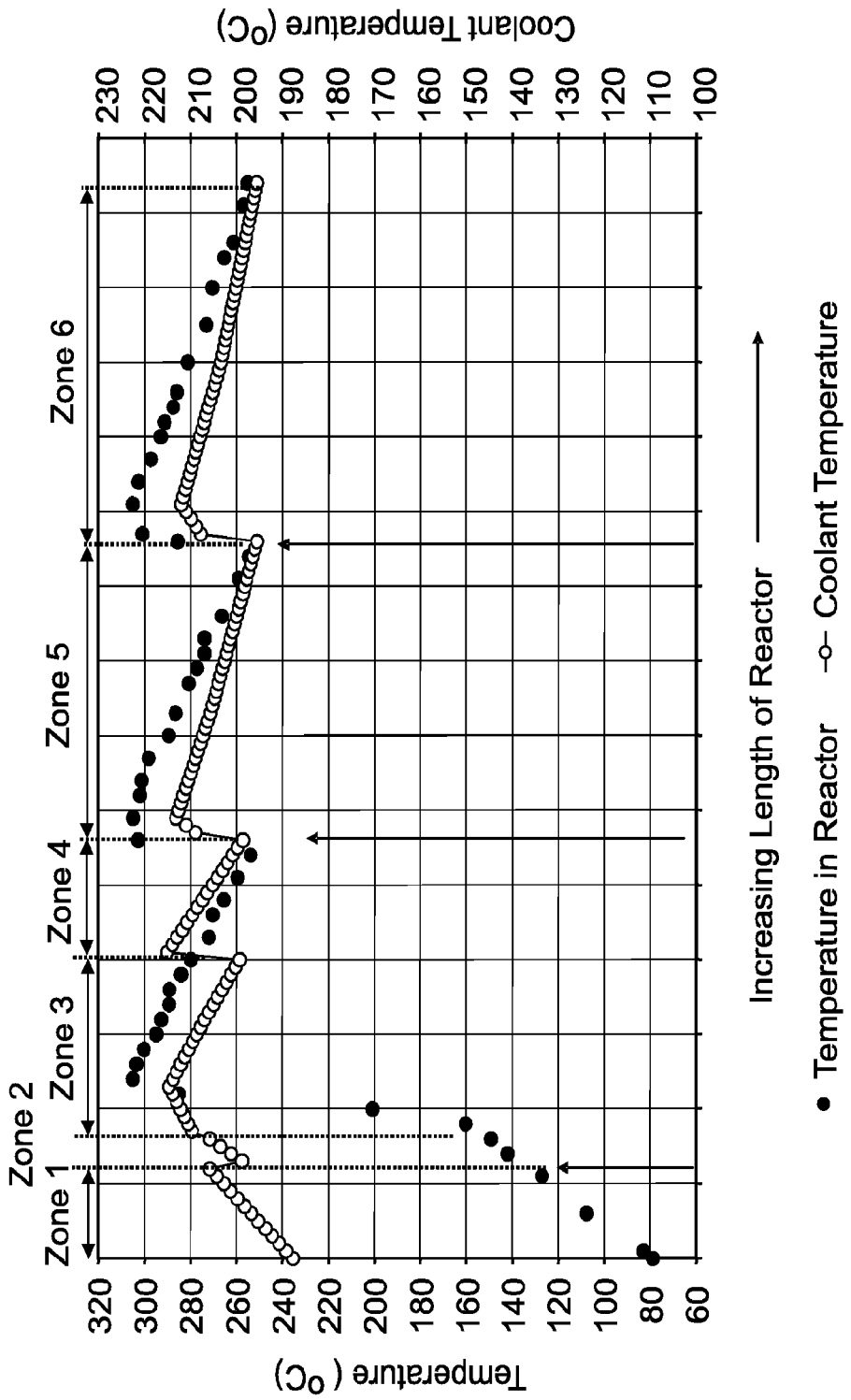
FIG. 5 depicts the temperature profile in the process reaction system for Example 2.
Figure 6:
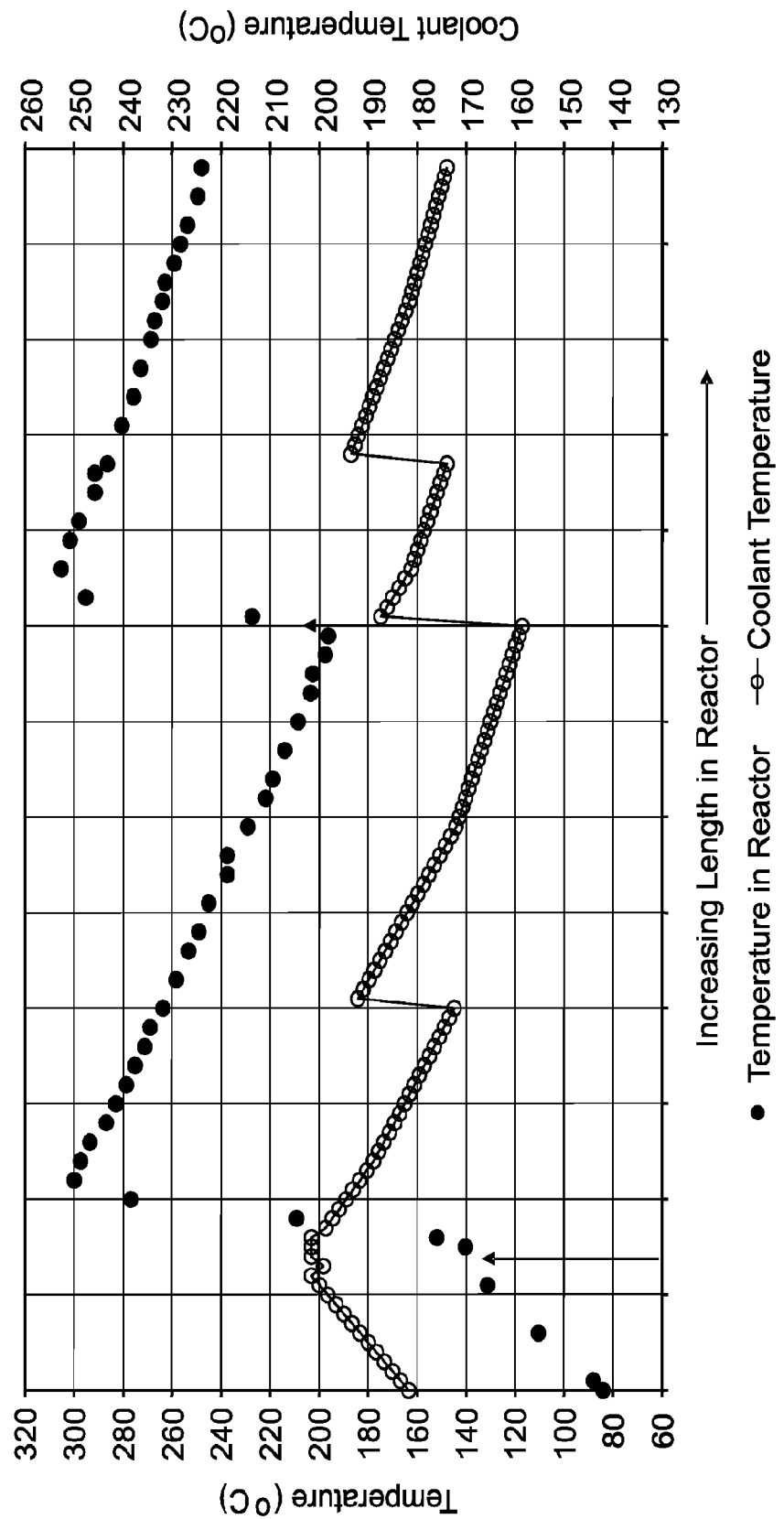
FIG. 6 depicts the temperature profile in the process reaction system for Comparative Example 20.

FIGS. 5 and 6 show the temperature profiles of Example 2 and Comparative Example 20, and the reaction zones with respect to the peroxide injections. The coolant temperature is that of the cooling fluid used to cool the reaction zones. The cooling fluid is fed counter current to the reactor. Several cooling zones are used to cool each reaction zone. Temperatures are measured going into and out of each cooling zone. The reactor temperature (y-axis) is made from inside the reactor along the length of the reactor. Each reaction temperature represents the reaction temperature at that point in the reactor. The x-axis shows the joint location between tubes, and the y-axis is temperature for the reaction and for the boiling water. Thermocouples were used to measure the reaction temperature down the tube during production. The reaction peaks for each zone were controlled by adjusting peroxide flows to each of the reaction zones. The peak temperatures were then used to help control the MWD/density of the product.

The activity of the different CTA's used can be described by a chain transfer constant, in which higher values of the chain transfer constant represent more highly active CTA's. The method of determining Cs, and Cs values, are contained in G. A. Mortimer, "Chain Transfer in Ethylene Polymerization," J. Polymer Science: Part A-1, Vol. 4, p. 881-900 (1966). As discussed above, the Cs for some common CTAs are shown in Table 5. In one embodiment, the CTA has a Cs value (1360 atm, 130° C.) from 0.001 to 0.070, preferably from 0.005 to 0.060, more preferably from 0.008 to 0.050, and even more preferably from 0.010 to 0.020 (see Mortimer reference above).

Tables 7-10 contain characterization data of the Examples (inventive polymers) and Comparative Examples (comparative polymers). Tables 7 and 8 show the melt index, density, melt strength, and DMS data of the Examples and Comparative Examples, respectively. The Examples cover a melt index range of 1.65-2.56, a density range of 0.9185-0.9216 g/cc, a melt strength range of 6.9-9.6, and a Viscosity Ratio range of 15.1-20.4. A wide range of comparative examples are listed in Table 8. In general, at a comparable melt index, the comparative examples tend to be higher in density, lower in melt strength, and have lower viscosity ratios.

Tables 9 and 10 contain the melt index, TDGPC properties, density, and CTA type of the Examples and Comparative Examples, respectively. The Examples tend to have a higher molecular weight distribution Mw/Mn, a higher normalized LSF, and a higher gpcBR than the Comparative Examples. These combined features result in an ethylene-based polymer with increased melt strength, improved processability or shear thinning, as indicated by a higher viscosity ratio (V0.1/V100, at 190° C.), and, as discussed below, increased film output on a blown film line. Also, it has been discovered, that the broader Mw/Mn of the inventive polymers, in combination with the normalized LSF, and a higher gpcBR, can be used in "linear low density polymers (LLDPE)—rich blends" to form films that have unexpectedly low haze.

TABLE 4

Peroxide initiator flows in kilograms per hour at each injection point used to manufacture Examples 1-6 and Comparative Example 20.

| Injection Point | Material | Ex. 1 (kg/hr) | Ex. 2 (kg/hr) | Ex. 3 (kg/hr) | Ex. 4 (kg/hr) | Ex. 5 (kg/hr) | Ex. 6 (kg/hr) | CE 20 (kg/hr) |
|---|---|---|---|---|---|---|---|---|
| #1 | TBPO | 0.85 | 0.80 | 0.69 | 0.92 | 0.95 | 0.92 | 2.18 |
| #1 | DTBP | 0.99 | 0.94 | 0.80 | 1.07 | 1.11 | 1.07 | 0.99 |
| #1 | PIV | 3.81 | 3.61 | 3.10 | 4.12 | 4.27 | 4.14 | 4.75 |
| #1 | Solvent | 22.57 | 21.40 | 18.39 | 24.41 | 25.30 | 24.52 | 31.67 |
| #2 | TBPO | 0.56 | 0.49 | 0.52 | 0.33 | 0.33 | 0.36 | 1.53 |
| #2 | DTBP | 1.11 | 0.98 | 1.04 | 1.50 | 1.51 | 1.62 | 2.30 |
| #2 | Solvent | 26.13 | 22.92 | 24.45 | 14.79 | 14.90 | 16.00 | 34.49 |
| #3 | TBPO | 0.73 | 0.61 | 0.39 | 0.35 | 0.40 | 0.39 | NA |
| #3 | DTBP | 1.47 | 1.22 | 0.77 | 1.59 | 1.79 | 1.74 | NA |
| #3 | Solvent | 34.45 | 28.73 | 18.13 | 15.69 | 17.68 | 17.21 | NA |

TABLE 5

Chain Transfer Constant (Cs) Measured at 1360 atm and 130° C. for CTA*

| CTA | Cs (1360 atm, 130° C.) | Standard Deviation |
|---|---|---|
| Isobutane | 0.005 | 0.001 |
| Propylene | 0.015 | 0.003 |
| 1-Butene | 0.056 | 0.002 |
| Methyl Ethyl Ketone | 0.060 | 0.005 |
| Propionaldehyde | 0.33 | 0.01 |

*G. A. Mortimer, "Chain Transfer in Ethylene Polymerization", J. Polymer Science: Part A-1, Vol 4, pp. 881-900 (1966).

TABLE 6

Tube process conditions used to manufacture Ex. 1-6 and Comp. Ex. 20.

| Process Variables | Ex. 1 | Ex. 2 | Ex. 3 | Ex. 4 | Ex. 5 | Ex. 6 | CE 20 |
|---|---|---|---|---|---|---|---|
| Reactor Pressure (Psig) | 35,900 | 35,900 | 35,900 | 34,850 | 34,850 | 34,850 | 38,250 |
| Zone 1 Initiation T (° C.) | 131 | 131 | 131 | 129 | 127 | 129 | 131 |
| Zone 1 Peak T (° C.) | 310 | 310 | 310 | 305 | 305 | 305 | 300 |
| Zone 2 Initiation T (° C.) | 257 | 257 | 258 | 252 | 253 | 249 | 196 |
| Zone 2 Peak T (° C.) | 305 | 305 | 305 | 305 | 305 | 305 | 305 |
| Zone 3 Initiation T (° C.) | 255 | 260 | 269 | 254 | 254 | 251 | N/A |
| Zone 3 Peak T (° C.) | 305 | 305 | 305 | 305 | 305 | 305 | N/A |
| Average Reactor T* (° C.) | 307 | 307 | 307 | 305 | 305 | 305 | 302 |
| Fresh Ethylene Flow (lb/hr) | 28,500 | 27,240 | 27,490 | 27,420 | 27,400 | 27,760 | 25,500 |
| Ethylene Throughput to Tube (lb/hr) | 101,000 | 101,000 | 101,000 | 101,300 | 101,300 | 101,300 | 100,800 |
| Ethylene Conversion (%) | 28 | 26 | 27 | 27 | 27 | 28 | 26 |
| Polyethylene Production Rate (lb/hr) | 27,600 | 26,300 | 26,800 | 27,100 | 27,400 | 27,700 | 26,300 |
| Propylene Flow (lb/hr) | 248 | 227 | N/A | 264 | 280 | 298 | 377 |
| Ethylene Purge Flow (lb/hr) | 500 | 500 | 1,031 | 793 | 845 | 489 | 500 |
| Recycle Propylene Conc. (wt %) | 1 | 0 | N/A | 1 | 1 | 1 | 1 |
| Isobutane Flow (lb/hr) | N/A | N/A | 82 | N/A | N/A | N/A | N/A |
| Recycle Isobutane Conc. (wt %) | N/A | N/A | 1 | N/A | N/A | N/A | N/A |
| BW** Drum Press. System 1 (Psig) | 140 | 140 | 140 | 220 | 220 | 220 | 120 |
| BW** Drum T System 1 (° C.) | 180 | 180 | 180 | 195 | 195 | 195 | 174 |

TABLE 6-continued

Tube process conditions used to manufacture Ex. 1-6 and Comp. Ex. 20.

| Process Variables | Ex. 1 | Ex. 2 | Ex. 3 | Ex. 4 | Ex. 5 | Ex. 6 | CE 20 |
|---|---|---|---|---|---|---|---|
| BW** Drum Press. System 2 (Psig) | 140 | 140 | 140 | 220 | 220 | 220 | 120 |
| BW** Drum T System 2 (° C.) | 180 | 180 | 180 | 195 | 195 | 195 | 174 |
| BW** Drum Press. System 3 (Psig) | 270 | 270 | 270 | 250 | 250 | 250 | 240 |
| BW** Drum T System 3 (° C.) | 210 | 210 | 210 | 205 | 205 | 205 | 200 |

*The average of the peak temperatures
**BW = "boiling water"

TABLE 7

Melt Index (I2), Density, Melt Strength (MS), and DMS Data at 190° C. of Exs.

| | I2 | Density (g/cc) | MS (cN) | Visc. 0.1 rad/s | Visc. 1 rad/s | Visc. 10 rad/s | Visc. 100 rad/s | Visc. Ratio | Tan Delta 0.1 rad/s |
|---|---|---|---|---|---|---|---|---|---|
| Ex. 1 | 1.84 | 0.9194 | 9.0 | 8,971 | 4,681 | 1,676 | 470 | 19.09 | 3.14 |
| Ex. 2 | 1.65 | 0.9185 | 9.6 | 10,032 | 5,082 | 1,782 | 492 | 20.40 | 2.96 |
| Ex. 3 | 1.85 | 0.9216 | 8.5 | 9,031 | 4,666 | 1,666 | 467 | 19.35 | 3.10 |
| Ex. 4 | 1.75 | 0.9191 | 9.4 | 8,972 | 4,677 | 1,687 | 472 | 19.01 | 3.12 |
| Ex. 5 | 2.43 | 0.9188 | 7.2 | 6,737 | 3,841 | 1,477 | 434 | 15.53 | 3.95 |
| Ex. 6 | 2.56 | 0.9190 | 6.9 | 6,386 | 3,684 | 1,430 | 424 | 15.07 | 4.08 |

*Viscosity Ratio = [Viscosity 0.1 rad/s]/[Viscosity 100 rad/s], at 190° C. Note Visc. = Viscosity

TABLE 8

Melt Index, Density, Melt Strength (MS), and DMS data at 190° C. of Comp. Exs.

| Sample | I2 | Density (g/cc) | MS (cN) | Visc. 0.1 rad/s | Visc. 1 rad/s | Visc. 10 rad/s | Visc. 100 rad/s | Visc. Ratio[a] | Tan Delta 0.1 rad/s |
|---|---|---|---|---|---|---|---|---|---|
| CE 1 | 2.54 | 0.9232 | 4.9 | 5,414 | 3,542 | 1,501 | 466 | 11.61 | 6.04 |
| CE 2 | 1.87 | 0.9205 | 6.9 | 7,837 | 4,532 | 1,754 | 515 | 15.22 | 4.18 |
| CE 3 | 1.90 | 0.9230 | 7.7 | 8,130 | 4,515 | 1,714 | 498 | 16.33 | 3.66 |
| CE 4 | 1.58 | 0.9223 | 8.5 | 9,932 | 5,172 | 1,849 | 517 | 19.20 | 3.14 |
| CE 5 | 0.67 | 0.9206 | 12.0 | 20,171 | 8,377 | 2,531 | 626 | 32.23 | 1.94 |
| CE 6 | 0.64 | 0.9205 | 12.1 | 20,309 | 8,480 | 2,566 | 635 | 31.96 | 1.97 |
| CE 7 | 0.68 | 0.9212 | 11.9 | 20,412 | 8,724 | 2,685 | 672 | 30.39 | 2.07 |
| CE 8 | 0.58 | 0.9211 | 14.4 | 22,233 | 8,966 | 2,649 | 641 | 34.70 | 1.86 |
| CE 9 | 0.52 | 0.9220 | 13.3 | 23,176 | 9,517 | 2,825 | 685 | 33.83 | 1.91 |
| CE 10 | 0.72 | 0.9232 | 14.0 | 18,892 | 8,156 | 2,566 | 658 | 28.72 | 2.11 |
| CE 11 | 0.84 | 0.9273 | 13.9 | 15,685 | 7,404 | 2,488 | 665 | 23.59 | 2.47 |
| CE 12 | 0.94 | 0.9233 | 13.5 | 13,138 | 6,507 | 2,247 | 606 | 21.69 | 2.82 |
| CE 13 | 0.61 | 0.9269 | 13.4 | 19,139 | 8,505 | 2,737 | 698 | 27.43 | 2.20 |
| CE 14 | 0.89 | 0.9240 | 13.1 | 15,792 | 7,352 | 2,427 | 633 | 24.95 | 2.48 |
| CE 15[b] | 0.75 | 0.9240 | 9.6 | 14,059 | 8,445 | 3,240 | 877 | 16.03 | 4.62 |
| CE 16[c] | 0.78 | 0.9232 | 11.9 | 13,341 | 7,646 | 2,897 | 791 | 16.87 | 3.98 |
| CE 17[d] | 0.90 | 0.9311 | 7.3 | 12,864 | 7,324 | 2,768 | 773 | 16.65 | 3.98 |
| CE 18 | 2.09 | 0.9248 | 6.3 | 6,786 | 4,147 | 1,675 | 507 | 13.37 | 4.78 |
| CE 19 | 2.12 | 0.9178 | 16.5 | 6,250 | 3,236 | 1,244 | 384 | 16.29 | 2.95 |
| CE 20 | 1.88 | 0.9204 | 7.2 | 7,631 | 4,423 | 1,730 | 509 | 15.00 | 4.17 |
| CE 21 | 1.61 | 0.9223 | 6.9 | 8,759 | 5,078 | 1,961 | 577 | 15.18 | 4.09 |
| CE 22[e] | 2.03 | 0.9238 | 6.8 | 6,558 | 4,183 | 1,752 | 543 | 12.09 | 5.56 |
| CE 23 | 2.18 | 0.9204 | 6.5 | 7,113 | 4,177 | 1,616 | 475 | 14.97 | 4.21 |

[a]Viscosity Ratio = [Viscosity 0.1 rad/s]/[Viscosity 100 rad/s] at 190° C. Note Visc. = Viscosity
[b]MarFlex 5755 (Chevron Phillips Chemical Company LP)
[c]Westlake EF403 (Westlake Chemical)
[d]Lupolen 3220F (LyondellBasell)
[e]ExxonMobil LDPE LD105.3 (ExxonMobil Chemical Company)

TABLE 9

Melt Index, TDGPC-related properties, density, and CTA of Comparative Examples.

| | I2 | cc-GPC Mw/Mn | LSF | Normalized LSF | cc-GPC Mn (g/mol) | cc-GPC Mw (g/mol) | cc-GPC Mz (g/mol) | gpcBR | Density (g/cc) | CTA |
|---|---|---|---|---|---|---|---|---|---|---|
| CE 1 | 2.54 | 6.61 | 1.47 | 11.42 | 10,070 | 72,730 | 258,700 | 1.61 | 0.9232 | Butene |
| CE 1 (wo AO)[a] | 2.54 | 5.69 | 1.47 | 9.83 | 12,840 | 73,050 | 256,600 | 1.53 | 0.9232 | Butene |
| CE 2 | 1.87 | 6.67 | 1.66 | 7.50 | 12,150 | 80,990 | 298,200 | 1.86 | 0.9205 | Propylene |
| CE 3 | 1.90 | 7.23 | 1.63 | 8.89 | 11,560 | 83,590 | 344,000 | 2.04 | 0.9230 | MEK & Propylene |
| CE 4 | 1.58 | 6.44 | 1.37 | 9.39 | 13,680 | 88,130 | 310,500 | 1.85 | 0.9223 | Butene |
| CE 5 | 0.67 | 8.72 | 0.91 | 6.39 | 12,090 | 105,390 | 387,000 | 1.68 | 0.9206 | Propylene |
| CE 6 | 0.64 | 8.43 | 0.78 | 6.91 | 12,360 | 104,160 | 367,200 | 1.58 | 0.9205 | Propylene |
| CE 7 | 0.68 | 6.94 | 1.04 | 4.49 | 13,760 | 95,460 | 331,100 | 1.58 | 0.9212 | Propylene |
| CE 8 | 0.58 | 8.52 | 1.14 | 4.34 | 11,990 | 102,160 | 365,200 | 1.87 | 0.9211 | Propylene |
| CE 9 | 0.52 | 7.69 | 1.32 | 3.04 | 12,640 | 97,240 | 366,000 | 1.78 | 0.9220 | Propylene |
| CE 10 | 0.72 | 7.55 | 1.62 | 3.36 | 13,660 | 103,200 | 438,200 | 1.87 | 0.9232 | MEK & Propylene |
| CE 11 | 0.84 | 7.53 | 1.74 | 3.63 | 13,000 | 97,890 | 359,200 | 1.43 | 0.9273 | MEK & Propylene |
| CE 12 | 0.94 | 6.33 | 3.00 | 1.97 | 14,830 | 93,840 | 259,300 | 1.11 | 0.9233 | Propionaldehde |
| CE 13 | 0.61 | 6.67 | 1.96 | 2.07 | 15,170 | 101,180 | 359,100 | 1.40 | 0.9269 | MEK & Propylene |
| CE 14 | 0.89 | 5.49 | 1.17 | 4.17 | 16,310 | 88,500 | 302,100 | 1.75 | 0.9240 | Butene |
| CE 15[b] | 0.75 | 3.64 | 2.53 | 1.07 | 20,750 | 75,630 | 165,100 | 0.76 | 0.9240 | Unknown |
| CE 16[c] | 0.78 | 4.19 | 1.69 | 1.93 | 20,160 | 84,440 | 210,300 | 1.07 | 0.9232 | Unknown |
| CE 17[d] | 0.90 | 5.09 | 1.59 | 2.88 | 13,620 | 69,280 | 223,400 | 0.88 | 0.9300 | None |
| CE 18 | 2.09 | 5.57 | 1.50 | 7.73 | 13,450 | 74,850 | 273,600 | 1.57 | 0.9248 | MEK & Propylene |
| CE 19 | 2.12 | 11.34 | 1.41 | 17.12 | 15,910 | 180,480 | 736,800 | 3.52 | 0.9178 | Isobutane |
| CE 20 | 1.78 | 12.24 | 2.07 | 10.55 | 20,290 | 248,260 | 815,900 | 5.77 | 0.9165 | None |
| CE 21 | 1.88 | 5.44 | 1.42 | 7.24 | 15,260 | 82,940 | 288,100 | 1.68 | 0.9204 | Propylene |
| CE 22[e] | 1.61 | 5.46 | 1.79 | 4.90 | 13,760 | 75,170 | 313,300 | 1.74 | 0.9223 | Propylene |
| CE 23 | 1.92 | 7.01 | 1.57 | 8.60 | 11,770 | 82,500 | 321,600 | 2.08 | 0.9213 | MEK & Propylene |
| CE 24 | 2.03 | 4.83 | 2.37 | 4.14 | 17,360 | 83,770 | 220,900 | 1.19 | 0.9238 | Unknown |
| CE 25 | 2.18 | 6.21 | 1.54 | 8.77 | 12,790 | 79,440 | 277,700 | 1.82 | 0.9204 | Propylene |

[a]Removed antioxidant (AO) peak consisting of 2,000 ppm Irganox I-1010 by peak skim feature as described in Light Scattering (LS) GPC Section.
[b]Marflex 5755 (Chevron Phillips Chemical Company LP);
[c]Westlake EF403 (Westlake Chemical)
[d]Lupolen 3220F (LyondellBasell);
[e]L ExxonMobil LDPE LD105.3

TABLE 10

Melt index, TDGPC-related properties, density, and CTA of Examples

| Ex. | I2 | cc-GPC Mw/Mn | LSF | Normalized LSF | cc-GPC Mn (g/mol) | cc-GPC Mw (g/mol) | cc-GPC Mz (g/mol) | gpcBR | Density (g/cc) | CTA |
|---|---|---|---|---|---|---|---|---|---|---|
| 1 | 1.84 | 8.21 | 1.11 | 13.7 | 11,220 | 92,140 | 334,700 | 2.07 | 0.9194 | Propylene |
| 2 | 1.65 | 7.63 | 1.16 | 10.9 | 11,890 | 90,720 | 317,600 | 2.04 | 0.9185 | Propylene |
| 3 | 1.85 | 7.92 | 1.31 | 11.2 | 11,450 | 90,710 | 338,400 | 2.14 | 0.9216 | Isobutane |
| 4 | 1.75 | 7.74 | 1.42 | 10.9 | 11,860 | 91,830 | 348,300 | 2.27 | 0.9191 | Propylene |
| 5 | 2.43 | 8.24 | 1.46 | 13.0 | 10,490 | 86,440 | 347,300 | 2.24 | 0.9188 | Propylene |
| 6 | 2.56 | 7.75 | 1.45 | 13.9 | 11,210 | 86,870 | 349,900 | 2.17 | 0.9190 | Propylene |

Branching results are shown in Table 11 for Examples, Comparative Examples, and LLDPE1. The C5 or amyl group is unique to LDPE. LLDPE1, used in the film trials, contains octene, resulting in the high levels of C6+.

TABLE 11

Branching results in branches per 1000C by $^{13}$C NMR of Examples, Comparative Examples, and LLDPE1 (discussed in Formulations Section).

| Sample | C1 | C2 | 1,3 diethyl | C2 on Quat Carbon | C4 | C5 (Amyl) | C6+ |
|---|---|---|---|---|---|---|---|
| Example 1 | 2.46 | ND | 4.26 | 1.43 | 6.73 | 2.02 | 3.4 |
| Example 2 | 2.39 | ND | 4.47 | 1.49 | 6.8 | 1.96 | 3.17 |
| Example 3 | 0.7 | ND | 3.92 | 1.52 | 6.79 | 2.15 | 3.55 |
| Example 4 | 2.3 | ND | 4.29 | 1.49 | 6.97 | 1.85 | 3.27 |
| Example 5 | 2.59 | ND | 4.22 | 1.43 | 6.78 | 1.89 | 3.19 |
| Example 6 | 2.52 | ND | 4.37 | 1.49 | 6.91 | 1.96 | 3.25 |
| CE 1 | ND | 1.04 | 3.26 | 1.12 | 6.01 | 1.92 | 2.93 |
| CE 2 | 3.54 | ND | 3.32 | 1.06 | 5.83 | 1.85 | 3.11 |
| CE 23 | 4.19 | ND | 3.7 | 1.02 | 5.82 | 1.8 | 2.93 |
| LLDPE 1 | ND | ND | ND | ND | ND | ND | 11.42 |

ND = Not Detected

Formulations

Blown films were made, and physical properties measured, with eight different LDPEs and one LLDPE. The LLDPE used, LLDPE1, was a 1.0 melt index (MI or I2), 0.920 g/cc density LLDPE produced by a Ziegler Natta catalysis. Films were made at 0 wt %, 20 wt %, 30 wt %, 70 wt %, and 100 wt % of the respective LDPE, based on the weight of the LDPE and LLDPE1. The following ethylene-based polymers (LDPEs) were used in the film samples: Examples 1, 4-6, and Comparative Examples 3, 20, and 21.

Each formulation was compounded on a MAGUIRE gravimetric blender. A polymer processing aid (PPA) was added to each formulation. The PPA was added at "1.125 wt % of masterbatch," based on the total weight of the weight of the formulation. The PPA masterbatch (CKAC-19, available from Ingenia Polymers) contained 8 wt % of DYNAMAR FX-5920A in polyethylene carrier.

LLDPE1 was also used as the LLDPE in the films made at maximum output. All samples were made with 80 wt % DOWLEX 2045G and 20 wt % LDPE. The LDPEs used in determining maximum film output were the following: Examples 1, 4-6, and Comparative Examples 3, 6, and 22.

Production of Films

The monolayer blown films were made on an 8 inch die with a polyethylene "Davis Standard Barrier II screw." External cooling by an air ring and internal bubble cooling were used. General blown film parameters used to produce each blown film are shown in Table 12. The temperatures are the temperatures closest to the pellet hopper (Barrel 1), and in increasing order, as the polymer was extruded through the die (melt temperature).

TABLE 12

Blown film fabrication conditions for films.

| Parameter | Value |
| --- | --- |
| Blow up ratio (BUR) | 2.5 |
| Output (lb/hr) | 350 standard rate |
| Film thickness | 2.0 |
| Die gap (mil) | 70, 40 (100% LDPE only) |
| Air temperature (° F.) | 45 |
| Temperature profile (° F.) | |
| Barrel 1 | 350 |
| Barrel 2 | 425 |
| Barrel 3 | 380 |
| Barrel 4 | 325 |
| Barrel 5 | 325 |
| Screen Temperature | 430 |
| Adapter | 430 |
| Rotator | 430 |
| Lower Die | 440 |
| Upper Die | 440 |
| Frost Line Height (FLH) (inches) | 33-35 standard rate |

Production of Films for Determination of Maximum Output Rate of Blown Film

Film samples were made at a controlled rate and at a maximum rate. The controlled rate was 350 lb/hr, which equals an output rate of 13.9 lb/hr/inch of die circumference. The die diameter used for the maximum output trials was an 8 inch die, so that for the controlled rate, as an example, the conversion between "lb/hr" and "lb/hr/inch" of die circumference, is shown in Equation 16. Similarly, such an equation can be used for other rates, such as the maximum rate, by substituting the maximum rate in Equation 16 to determine the "lb/hr/inch" of die circumference.

$$\text{Lb/Hr/Inch of Die Circumference} = (350 \text{ Lb/Hr})/(8*\pi) = 10 \quad \text{(Eq. 16)}$$

The maximum rate for a given sample was determined by increasing the output rate to the point where bubble stability was the limiting factor. The extruder profile was maintained for both samples (standard rate and maximum rate), however the melt temperature was higher for the maximum rate samples, due to the increased shear rate with higher motor speed (rpm, revolutions per minute). The maximum bubble stability was determined by taking the bubble to the point where it would not stay seated in the air ring. At that point, the rate was reduced to where the bubble was reseated in the air ring, and then a sample was collected. The cooling on the bubble was adjusted by adjusting the air ring and maintaining the bubble. This was taken as the maximum output rate while maintaining bubble stability.

Film Properties

Tables 13-15 shows the film results for the films produced at the standard rate of 350 lb/hr at 20%, 30%, and 70% LDPE. From Tables 13-15, both the total and internal haze are low, the gloss is high, and the MD and CD shrink tension are high for the Examples as compared to the Comparative Examples. Table 13 shows that for a "20% LDPE blend," the total haze and the internal haze are low, the puncture is high, and the MD shrink tension is high for the average of the Inventive Formulations (each containing an inventive polymer), as compared to the Comparative Formulations (each containing a comparative polymer). Table 14 shows that for a "30% LDPE blend," the dart A and MD shrink tension are both high for the average of the Inventive Formulations, as compared to the Comparative Formulations. Table 15 shows that for a "70% LDPE blend," the internal haze, puncture, and MD shrink tension are all high for the average of the Inventive Formulations, as compared to the Comparative Formulations. Overall, the Inventive Examples show improved performance of lower haze, higher toughness (puncture, dart) and higher shrink tension, as compared to the Comparative Examples.

Tables 16 and 17 describe the maximum rate data, and the film properties of these samples. Table 16 show that the Examples have high maximum output rates, and that these output rates are similar to a LDPE of much lower melt index (Comparative Example 6—Formulation 23). Table 16 shows that for a "20% LDPE blend," the maximum output performance of Inventive Example 4 (Formulation 25), at "1.75 melt index," is surprisingly similar to a LDPE of much lower melt index (0.64 melt index—Comparative Example 6). Inventive Sample 4 also has improved haze, gloss, and MD tear. Table 17 shows for a "20% LDPE blend" at maximum output, the haze is low and the gloss is high for the Inventive Formulations (each containing an inventive polymer) as compared to the Comparative Formulations (each containing a comparative polymer). Overall, the Inventive Formulations have improved performance of lower haze, higher toughness (puncture, dart), higher shrink tension, and higher maximum output at the bubble stability limit, at similar melt index, as compared to the Comparative Formulations.

TABLE 13

Film Properties of 80% LLDPE1/20% LDPE Formulations #1-7 made at 2 mil at standard rate of 350 lb/hr (8" die).

| | Formulation | | | | | | |
|---|---|---|---|---|---|---|---|
| | 1 | 2 | 3 | 4 | 5 | 6 | 7 |
| Component 1 | LLDPE1 | LLDPE1 | LLDPE1 | LLDPE1 | LLDPE1 | LLDPE1 | LLDPE1 |
| Wt % Component 1 | 80 | 80 | 80 | 80 | 80 | 80 | 80 |
| Component 2 | Example 4 | Example 5 | Example 6 | Example 1 | CE 20 | CE 3 | CE 21 |
| Wt % Component 2 | 20 | 20 | 20 | 20 | 20 | 20 | 20 |
| Haze (%) | 7.5 | 7.2 | 7.2 | 7.1 | 8.2 | 7.4 | 9.0 |
| Haze, Internal (%) | 3.5 | 3.7 | 3.7 | 3.3 | 4.7 | 4.0 | 5.1 |
| 45 Degree Gloss (%) | 71.1 | 73.3 | 73.2 | 72.0 | 71.8 | 72.8 | 70.3 |
| Clarity (%) | 98.9 | 99.1 | 99.0 | 99.0 | 99.0 | 99.2 | 99.2 |
| MD Tear (g) | 358 | 475 | 409 | 403 | 420 | 469 | 490 |
| CD Tear (g) | 1,750 | 1,600 | 1,714 | 1,446 | 1,427 | 1,611 | 1,597 |
| Dart A (g) | 256 | 238 | 244 | 253 | 253 | 250 | 301 |
| Puncture (ft-lb/in$^3$) | 218 | 211 | 192 | 233 | 198 | 163 | 177 |
| 2% MD Secant Modulus (Psi) | 28,815 | 28,894 | 29,499 | 28,785 | 29,070 | 29,805 | 29,834 |
| 2% CD Secant Modulus (Psi) | 32,275 | 33,024 | 32,086 | 31,837 | 32,047 | 34,013 | 32,649 |
| MD Shrink Tension (Psi) | 12.38 | 10.84 | 9.60 | 9.09 | 8.75 | 9.48 | 8.26 |
| CD Shrink Tension (Psi) | 0.39 | 0.38 | 0.45 | 0.53 | 0.61 | 0.53 | 0.67 |
| I2 | 0.91 | 0.96 | 0.96 | 0.94 | 0.92 | 0.94 | 0.93 |
| I10 | 7.71 | 8.16 | 8.19 | 8.06 | 7.88 | 7.90 | 7.67 |
| I10/I2 | 8.52 | 8.50 | 8.52 | 8.59 | 8.58 | 8.43 | 8.26 |
| Density (g/cc) | 0.9213 | 0.9211 | 0.9211 | 0.9212 | 0.9219 | 0.9219 | 0.9215 |
| Thickness (mil) | 1.94 | 1.93 | 1.99 | 1.95 | 2.00 | 1.98 | 2.00 |

TABLE 14

Film Properties of 70% LLDPE1/30% LDPE Formulations #8-14 made at 2 mil at standard rate of 350 lb/hr (8" die).

| | Formulation | | | | | | |
|---|---|---|---|---|---|---|---|
| | 8 | 9 | 10 | 11 | 12 | 13 | 14 |
| Component 1 | LLDPE1 | LLDPE1 | LLDPE1 | LLDPE1 | LLDPE1 | LLDPE1 | LLDPE1 |
| Wt % Component 1 | 70 | 70 | 70 | 70 | 70 | 70 | 70 |
| Component 2 | Example 4 | Example 5 | Example 6 | Example 1 | CE 20 | CE 3 | CE 21 |
| Wt % Component 2 | 30 | 30 | 30 | 30 | 30 | 30 | 30 |
| Haze (%) | 6.5 | 6.6 | 6.3 | 6.9 | 7.0 | 6.3 | 7.2 |
| Haze, Internal (%) | 2.9 | 3.5 | 3.3 | 3.8 | 3.8 | 3.1 | 4.1 |
| 45 Degree Gloss (%) | 74.4 | 75.7 | 77.0 | 74.7 | 75.1 | 76.0 | 75.6 |
| Clarity (%) | 98.4 | 98.8 | 98.7 | 98.9 | 98.6 | 98.8 | 99.0 |
| MD Tear (g) | 294 | 288 | 264 | 347 | 294 | 359 | 319 |
| CD Tear (g) | 1,519 | 1,386 | 1,460 | 1,490 | 1,513 | 1,521 | 1,416 |
| Dart A (g) | 229 | 196 | 217 | 235 | 205 | 199 | 184 |
| Puncture (ft-lb/in$^3$) | 184 | 171 | 174 | 169 | 173 | 143 | 181 |
| 2% MD Secant Modulus (Psi) | 28,556 | 28,189 | 28,344 | 28,698 | 29,252 | 29,628 | 30,099 |
| 2% CD Secant Modulus (Psi) | 31,367 | 31,490 | 30,414 | 31,420 | 31,901 | 33,154 | 32,563 |
| MD Shrink Tension (Psi) | 10.98 | 9.63 | 15.40 | 9.52 | 11.66 | 9.40 | 9.87 |
| CD Shrink Tension (Psi) | 0.54 | 0.47 | 0.54 | 0.54 | 0.64 | 0.33 | 0.46 |
| I2 | 0.89 | 0.98 | 0.91 | 0.94 | 0.95 | 0.95 | 0.93 |
| I10 | 8.03 | 8.66 | 8.65 | 8.23 | 8.55 | 8.47 | 8.26 |
| I10/I2 | 9.02 | 8.85 | 9.53 | 8.79 | 8.97 | 8.94 | 8.92 |
| Density (g/cc) | 0.9208 | 0.9205 | 0.9207 | 0.9205 | 0.9217 | 0.9221 | 0.9210 |
| Thickness (mil) | 1.96 | 1.93 | 2.02 | 1.99 | 2.00 | 1.94 | 2.00 |

TABLE 15

Film Properties of 30% LLDPE1/70% LDPE and 100% LLDPE 1 Formulations #15-22 made at 2 mil at standard rate of 350 lb/hr (8" die).

| | Formulation | | | | | | | |
|---|---|---|---|---|---|---|---|---|
| | 15 | 16 | 17 | 18 | 19 | 20 | 21 | 22 |
| Component 1 | LLDPE1 | LLDPE1 | LLDPE1 | LLDPE1 | LLDPE1 | LLDPE1 | LLDPE1 | LLDPE1 |
| Wt % Component 1 | 30 | 30 | 30 | 30 | 30 | 30 | 30 | 100 |
| Component 2 | Example 4 | Example 5 | Example 6 | Example 1 | CE 20 | CE 3 | CE 21 | NA |
| Wt % Component 2 | 70 | 70 | 70 | 70 | 70 | 70 | 70 | 0 |
| Haze (%) | 7.9 | 7.0 | 7.4 | 7.8 | 7.0 | 7.6 | 8.2 | 13.5 |

TABLE 15-continued

Film Properties of 30% LLDPE1/70% LDPE and 100% LLDPE 1 Formulations #15-22 made at 2 mil at standard rate of 350 lb/hr (8" die).

| | Formulation | | | | | | | |
|---|---|---|---|---|---|---|---|---|
| | 15 | 16 | 17 | 18 | 19 | 20 | 21 | 22 |
| Haze, Internal (%) | 2.2 | 2.6 | 2.8 | 2.4 | 2.9 | 3.2 | 3.7 | 4.7 |
| 45 Degree Gloss (%) | 65.1 | 70.5 | 70.2 | 66.2 | 71.8 | 67.2 | 69.7 | 51.1 |
| Clarity (%) | 92.4 | 94.7 | 94.0 | 93.3 | 95.9 | 94.5 | 96.3 | 98.5 |
| MD Tear (g) | 307 | 306 | 306 | 261 | 278 | 275 | 282 | 887 |
| CD Tear (g) | 567 | 912 | 626 | 642 | 792 | 679 | 895 | 1,152 |
| Dart A (g) | 124 | 118 | 100 | 112 | 112 | 106 | 115 | 412 |
| Puncture (ft-lb/in$^3$) | 84 | 86 | 79 | 95 | 82 | 81 | 81 | 231 |
| 2% MD Secant Modulus (Psi) | 27,023 | 27,216 | 26,739 | 27,539 | 28,120 | 30,292 | 30,168 | 28,426 |
| 2% CD Secant Modulus (Psi) | 30,989 | 30,471 | 29,463 | 31,241 | 31,734 | 34,271 | 33,875 | 31,469 |
| MD Shrink Tension (Psi) | 24.61 | 20.78 | 17.21 | 19.89 | 17.38 | 18.24 | 16.63 | 3.64 |
| CD Shrink Tension (Psi) | 0.36 | 0.21 | 0.49 | 0.49 | 0.60 | 0.37 | 0.40 | 0.46 |
| I2 | 1.05 | 1.19 | 1.33 | 1.06 | 1.12 | 1.16 | 1.06 | 1.03 |
| I10 | 12.25 | 14.03 | 15.17 | 12.80 | 14.07 | 13.43 | 12.02 | 8.13 |
| I10/I2 | 11.71 | 11.77 | 11.44 | 12.12 | 12.62 | 11.59 | 11.35 | 7.93 |
| Density (g/cc) | 0.9204 | 0.9205 | 0.9204 | 0.9206 | 0.9219 | 0.9232 | 0.9227 | 0.9205 |
| Thickness (mil) | 2.02 | 1.99 | 2.00 | 2.00 | 1.92 | 2.02 | 1.99 | 1.86 |

TABLE 16

Maximum Rate Output at Bubble Stability Limit of Formulations 23-30.

| Formulation | Component 1 | Wt % Component 1 | Component 2 | Wt % Component 2 | I2 of Component 2 | Maximum Rate Output (lb/hr) | Maximum Rate Output (lb/hr/in) |
|---|---|---|---|---|---|---|---|
| 23 | LLDPE1 | 80 | CE 6 | 20 | 0.64 | 473 | 18.8 |
| 24 | LLDPE1 | 80 | CE 3 | 20 | 1.90 | 469 | 18.7 |
| 25 | LLDPE1 | 80 | Example 4 | 20 | 1.75 | 462 | 18.4 |
| 26 | LLDPE1 | 80 | Example 1 | 20 | 1.84 | 445 | 17.7 |
| 27 | LLDPE1 | 80 | Example 6 | 20 | 2.56 | 442 | 17.6 |
| 28 | LLDPE1 | 80 | Example 5 | 20 | 2.43 | 425 | 16.9 |
| 29 | LLDPE1 | 80 | CE 22 | 20 | 2.03 | 420 | 16.7 |
| 30 | LLDPE1 | 100 | NA | 0 | NA | 351 | 13.9 |

TABLE 17

Film Properties of Samples Made at Maximum Rate Output at Bubble Stability Limit of Formulations 23-30.

| | Formulation | | | | | | | |
|---|---|---|---|---|---|---|---|---|
| | 23 | 24 | 25 | 26 | 27 | 28 | 29 | 30 |
| Component 1 | LLDPE1 | LLDPE1 | LLDPE1 | LLDPE1 | LLDPE1 | LLDPE1 | LLDPE1 | LLDPE1 |
| Wt % Component 1 | 80 | 80 | 80 | 80 | 80 | 80 | 80 | 100 |
| Component 2 | CE 6 | CE 3 | Ex. 4 | Ex. 1 | Ex. 6 | Ex. 5 | CE 22 | NA |
| Wt % Component 2 | 20 | 20 | 20 | 20 | 20 | 20 | 20 | NA |
| Haze (%) | 9.22 | 8.35 | 8.52 | 8.65 | 8.10 | 8.93 | 9.77 | 20.14 |
| Haze, Internal (%) | 4.06 | 4.20 | 4.24 | 3.99 | 4.33 | 5.02 | 4.81 | 5.82 |
| 45 Degree Gloss (%) | 63.04 | 70.36 | 68.10 | 68.80 | 71.88 | 70.48 | 66.18 | 38.82 |
| MD Elmendor Tear (g) | 403 | 446 | 445 | 447 | 391 | 418 | 476 | 882 |
| CD Elmendor Tear (g) | 1,729 | 1,697 | 1,597 | 1,661 | 1,392 | 1,422 | 1,443 | 1,279 |
| Dart A (g) | 211 | 211 | 214 | 196 | 178 | 217 | 262 | 382 |
| Puncture (ft-lb/in3) | 199 | 214 | 186 | 199 | 194 | 187 | 146 | 261 |
| 2% MD Secant Modulus (Psi) | 30,951 | 32,300 | 29,689 | 30,500 | 30,961 | 30,167 | 32,058 | 30,598 |
| 2% CD Secant Modulus (Psi) | 36,476 | 35,787 | 33,330 | 33,004 | 34,091 | 33,928 | 37,107 | 36,306 |
| Thickness (mil) | 1.92 | 1.99 | 2.08 | 2.09 | 1.96 | 1.92 | 1.99 | 2.98 |

The invention claimed is:

1. An ethylene-based polymer comprising the following properties:

A) a $MWD_{conv}$ from 7 to 10;

B) a "normalized LSF" greater than, or equal to, 9.5; and wherein the ethylene-based polymer has a rheology ratio (V0.1/V100), at 190° C., from 10 to 25.

2. The ethylene-based polymer of claim 1, wherein the ethylene-based polymer further comprises C) a melt index greater than, or equal to, 1.0 g/10 min.

3. The ethylene-based polymer of claim 1, wherein the ethylene-based polymer is formed in a high pressure (P greater than 100 MPa) polymerization process.

4. The ethylene-based polymer of claim 1, wherein the ethylene-based polymer is a low density polyethylene (LDPE).

5. The ethylene-based polymer of claim 1, wherein the ethylene-based polymer has ≥0.1 amyl branch(es) per 1000 carbon atoms.

6. The ethylene-based polymer of claim 1, wherein the ethylene-based polymer has a density from 0.90 to 0.95 g/cc.

7. The ethylene-based polymer of claim 1, wherein the ethylene-based polymer has a melt strength from 5 to 15 cN.

8. A composition comprising the ethylene-based polymer of claim 1.

9. The composition of claim 8, further comprising a heterogeneously branched ethylene/α-olefin interpolymer.

10. The composition of claim 8, wherein the ethylene-based polymer is present at greater than, or equal to, 10 weight percent, based on the weight of the composition.

11. An article comprising at least one component formed from the composition of claim 8.

12. The article of claim 10, wherein the article is a film.

13. The article of claim 12, wherein the film has a haze less than 8% and a MD shrink tension greater than 9 psi.

14. The article of claim 12, wherein the film has a puncture greater than 180 ft-lb/in$^3$.

\* \* \* \* \*